United States Patent
Zach et al.

(10) Patent No.: US 11,729,038 B2
(45) Date of Patent: Aug. 15, 2023

(54) REDUCING AMPLITUDE SIGNALING OVERHEAD IN PEAK SUPPRESSION INFORMATION

(71) Applicant: QUALCOMM incorporated, San Diego, CA (US)

(72) Inventors: Noam Zach, Kiryat Ono (IL); Guy Wolf, Rosh Haayin (IL); Ory Eger, Tel Aviv (IL); Sharon Levy, Binyamina (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/334,245

(22) Filed: May 28, 2021

(65) Prior Publication Data
US 2021/0385116 A1    Dec. 9, 2021

Related U.S. Application Data

(60) Provisional application No. 63/034,760, filed on Jun. 4, 2020.

(51) Int. Cl.
*H04L 27/26* (2006.01)

(52) U.S. Cl.
CPC .................. *H04L 27/2614* (2013.01)

(58) Field of Classification Search
CPC ............. H04L 27/2614; H04L 27/2623; H04L 5/0053
See application file for complete search history.

(56) References Cited

U.S. PATENT DOCUMENTS

| 8,687,734 | B1* | 4/2014 | Chester | H04L 27/2614 |
| | | | | 370/208 |
| 11,190,383 | B2* | 11/2021 | Eger | H04B 7/0456 |
| 11,201,773 | B1* | 12/2021 | Zach | H04L 1/001 |
| 11,424,897 | B2* | 8/2022 | Eger | H04L 27/2624 |
| 11,444,578 | B2* | 9/2022 | Cappello | H03F 3/189 |
| 2009/0060073 | A1* | 3/2009 | Yano | H04L 27/2623 |
| | | | | 455/63.1 |

(Continued)

FOREIGN PATENT DOCUMENTS

| JP | 2021118431 A | * | 8/2021 | ............... H03F 3/19 |
| WO | WO-2019217372 A1 | * | 11/2019 | ........... H03F 1/0227 |

*Primary Examiner* — Jay P Patel
(74) *Attorney, Agent, or Firm* — Arun Swain; Holland & Hart LLP

(57) ABSTRACT

Methods, systems, and devices for wireless communications are described. A transmitting device may reduce a channel overhead of a peak suppression information message (PSIM) by reducing amplitude signaling of clipped peaks of a data signal. To avoid including amplitude information for each clipped peak of a time-domain data signal in a PSIM, the transmitting device may subtract a constant amplitude offset from each peak above a clipping threshold in the time-domain data signal. The transmitting device may indicate the amplitude offset in the PSIM, and a receiving device may reconstruct the data message based on the amplitude offset. In some examples, the transmitting device may indicate a peak to average power ratio (PAPR) in the PSIM, such as a PAPR of a maximum peak in the data signal. Based on the indicated PAPR, the receiving device may perform a calculation to determine the amplitude offset for reconstructing the data message.

22 Claims, 17 Drawing Sheets

(56) References Cited

U.S. PATENT DOCUMENTS

| | | | |
|---|---|---|---|
| 2016/0006545 A1* | 1/2016 | Fu | H04J 3/1658 |
| | | | 398/49 |
| 2021/0119582 A1* | 4/2021 | Cappello | H02M 7/483 |
| 2021/0281457 A1* | 9/2021 | Eger | H04L 27/3411 |
| 2021/0306194 A1* | 9/2021 | Eger | H04L 25/0224 |
| 2021/0328751 A1* | 10/2021 | Eger | H04L 5/023 |
| 2021/0328752 A1* | 10/2021 | Eger | H04L 5/0007 |
| 2021/0351889 A1* | 11/2021 | Landis | H04L 5/0055 |
| 2021/0377091 A1* | 12/2021 | Zach | H04L 1/0004 |
| 2021/0377092 A1* | 12/2021 | Zach | H04L 27/2623 |

* cited by examiner

REDUCING AMPLITUDE SIGNALING OVERHEAD IN PEAK SUPPRESSION INFORMATION

CROSS REFERENCE

The present application for patent claims the benefit of U.S. Provisional Patent Application No. 63/034,760 by ZACH et al., entitled "REDUCING AMPLITUDE SIGNALING OVERHEAD IN PEAK SUPPRESSION INFORMATION," filed Jun. 4, 2020, assigned to the assignee hereof, and expressly incorporated by reference herein.

TECHNICAL FIELD

The following relates generally to wireless communications and more specifically to reducing amplitude signaling overhead in peak suppression information.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A signal transmitted by a base station or a UE has an associated peak to average power ratio (PAPR). PAPR represents a relation between a maximum power of the signal and an average power of the signal over a duration of the transmission. As PAPR increases, the efficiency of a power amplifier (PA) amplifying the signal decreases. Devices with inefficient PAs consume more power, in addition to other performance drawbacks.

SUMMARY

The described techniques relate to improved methods, systems, devices, and apparatuses that support reducing amplitude signaling overhead in peak suppression information. Generally, the described techniques may enable a transmitting device to reduce a channel overhead of a peak suppression information message (PSIM) by reducing amplitude signaling of clipped peaks of a data signal. To avoid including amplitude information for each clipped peak of a time-domain data signal in a PSIM, the transmitting device may adjust (for example, subtract) an amplitude offset (for example, a constant amplitude offset) from each peak above a clipping threshold in the time-domain data signal. The transmitting device may indicate the amplitude offset in the PSIM, and a receiving device may reconstruct the data message based on the amplitude offset. In some examples, the transmitting device may indicate, in the PSIM, a peak to average power ratio (PAPR), such as a PAPR of a maximum peak in the data signal. Based on the indicated PAPR, the receiving device may perform a calculation (for example, a root mean square (RMS) calculation) to determine the amplitude offset for reconstructing the data message.

One innovative aspect of the subject matter described in this disclosure can be implemented in a method for wireless communication at a receiving device. The method includes receiving a message including peak suppression information corresponding to a subset of amplitude peaks of a data signal, determining a constant amplitude offset corresponding to the subset of amplitude peaks of the data signal based on the peak suppression information, receiving a data signal in a duration corresponding to the peak suppression information, reconstructing at least a portion of a data message based on adding the constant amplitude offset to each amplitude peak of the subset of amplitude peaks of the data signal, and decoding the reconstructed portion of the data message.

Another innovative aspect of the subject matter described in this disclosure can be implemented in an apparatus for wireless communication at a receiving device. The apparatus includes a processor, memory coupled with the processor, and instructions stored in the memory. The instructions may be executable by the processor to cause the apparatus to receive a message including peak suppression information corresponding to a subset of amplitude peaks of a data signal, determine a constant amplitude offset corresponding to the subset of amplitude peaks of the data signal based on the peak suppression information, receive a data signal in a duration corresponding to the peak suppression information, reconstruct at least a portion of a data message based on adding the constant amplitude offset to each amplitude peak of the subset of amplitude peaks of the data signal, and decode the reconstructed portion of the data message.

Another innovative aspect of the subject matter described in this disclosure can be implemented in an apparatus for wireless communication at a receiving device. The apparatus includes means for receiving a message including peak suppression information corresponding to a subset of amplitude peaks of a data signal, determining a constant amplitude offset corresponding to the subset of amplitude peaks of the data signal based on the peak suppression information, receiving a data signal in a duration corresponding to the peak suppression information, reconstructing at least a portion of a data message based on adding the constant amplitude offset to each amplitude peak of the subset of amplitude peaks of the data signal, and decoding the reconstructed portion of the data message.

Another innovative aspect of the subject matter described in this disclosure can be implemented in a non-transitory computer-readable medium storing code for wireless communications at a receiving device. The code may include instructions executable by a processor to receive a message including peak suppression information corresponding to a subset of amplitude peaks of a data signal, determine a constant amplitude offset corresponding to the subset of amplitude peaks of the data signal based on the peak suppression information, receive a data signal in a duration corresponding to the peak suppression information, reconstruct at least a portion of a data message based on adding the constant amplitude offset to each amplitude peak of the subset of amplitude peaks of the data signal, and decode the reconstructed portion of the data message.

Another innovative aspect of the subject matter described in this disclosure can be implemented in a method of wireless communications at a transmitting device. The method includes determining a peak configuration corresponding to a duration associated with at least a portion of a data message, deconstructing at least the portion of the data message into a data signal and peak suppression information based on subtracting a constant amplitude offset from each amplitude peak of a subset of amplitude peaks of the data signal, the constant amplitude offset associated with the peak configuration, and transmitting the data signal in the duration and a message including the peak suppression information.

Another innovative aspect of the subject matter described in this disclosure can be implemented in an apparatus for wireless communications at a transmitting device. The apparatus includes a processor, memory coupled with the processor, and instructions stored in the memory. The instructions may be executable by the processor to cause the apparatus to determine a peak configuration corresponding to a duration associated with at least a portion of a data message, deconstruct at least the portion of the data message into a data signal and peak suppression information based on subtracting a constant amplitude offset from each amplitude peak of a subset of amplitude peaks of the data signal, the constant amplitude offset associated with the peak configuration, and transmit the data signal in the duration and a message including the peak suppression information.

Another innovative aspect of the subject matter described in this disclosure can be implemented in an apparatus for wireless communications at a transmitting device. The apparatus includes means for determining a peak configuration corresponding to a duration associated with at least a portion of a data message, deconstructing at least the portion of the data message into a data signal and peak suppression information based on subtracting a constant amplitude offset from each amplitude peak of a subset of amplitude peaks of the data signal, the constant amplitude offset associated with the peak configuration, and transmitting the data signal in the duration and a message including the peak suppression information.

Another innovative aspect of the subject matter described in this disclosure can be implemented in a non-transitory computer-readable medium storing code for wireless communications at a transmitting device. The code may include instructions executable by a processor to determine a peak configuration corresponding to a duration associated with at least a portion of a data message, deconstruct at least the portion of the data message into a data signal and peak suppression information based on subtracting a constant amplitude offset from each amplitude peak of a subset of amplitude peaks of the data signal, the constant amplitude offset associated with the peak configuration, and transmit the data signal in the duration and a message including the peak suppression information.

BRIEF DESCRIPTION OF THE DRAWINGS

Like reference numbers and designations in the various drawings indicate like elements.

DETAILED DESCRIPTION

Figure 1:
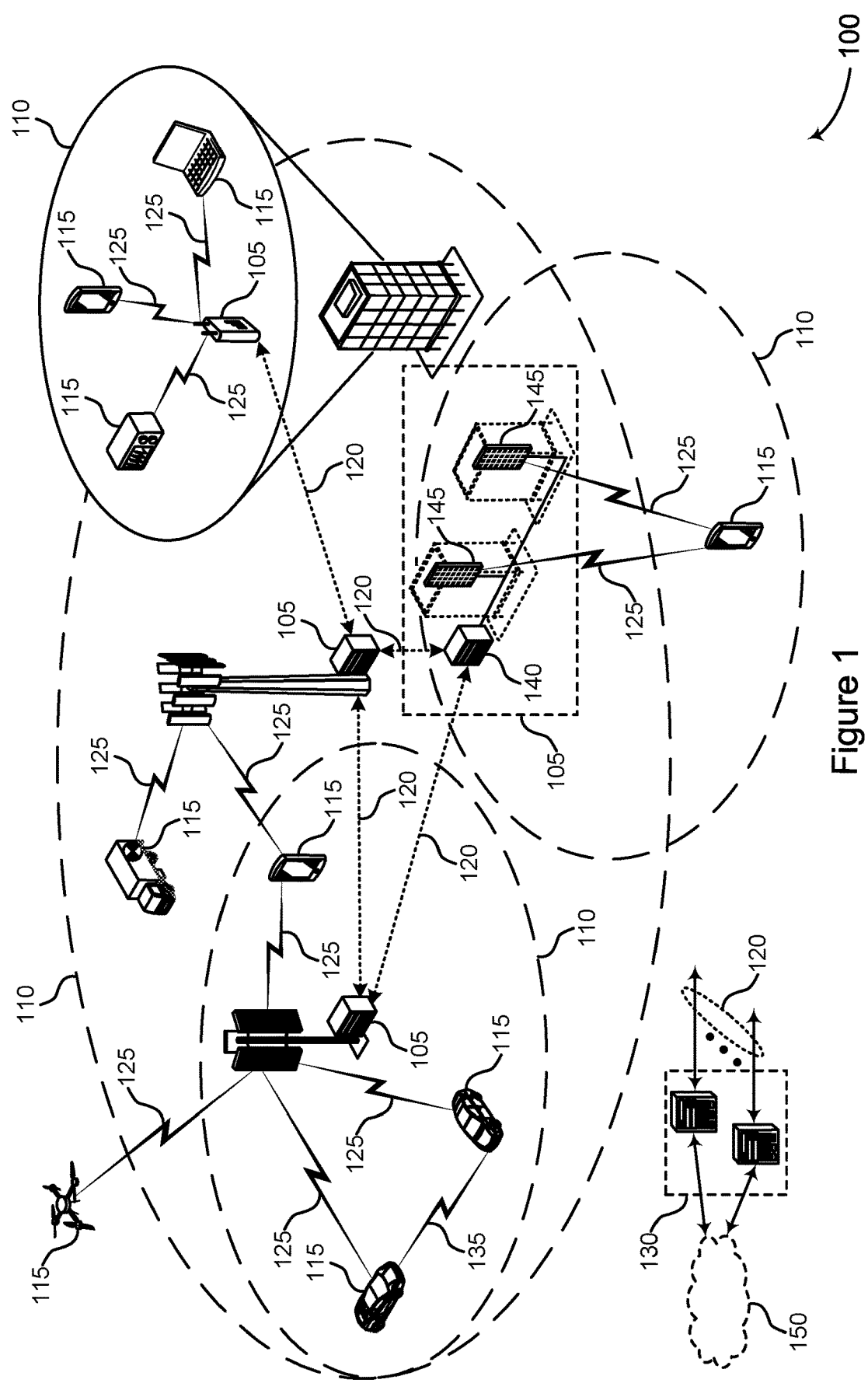
FIGS. 1 and 2 illustrate examples of wireless communications systems that support reducing amplitude signaling overhead in peak suppression information in accordance with aspects of the present disclosure.

Some wireless communications systems (for example, 5G New Radio (NR) systems) support higher-order constellations (such as 256 quadrature amplitude modulation (QAM), 1024 QAM, 4K QAM, or 16K QAM, among other examples) which are associated with a low error vector magnitude (EVM) to ensure accurate data recovery. EVM refers to a measure of the distance between the points on a constellation and their ideal locations. As each constellation point represents a different phase and amplitude combination, a transmitter includes a power amplifier (PA) with an operating range that is large enough to generate constellations with low EVM. Orthogonal frequency division multiple access (OFDMA) signaling techniques may yield relatively higher peak-to-average power ratios (PAPRs) compared to single-carrier signaling techniques, which may increase power consumption of the PA at the transmitter or reduce the efficiency of the PA at the transmitter, among other examples.

In some cases, to reduce PAPR, a transmitting device (for example, a base station) may clip peaks corresponding to data samples of a time-domain data signal to reduce the amplitudes associated with the respective data samples such that they are below a clipping threshold or peak amplitude threshold. Along with clipping the peaks, the transmitting device may generate peak suppression information associated with the clipped peaks and may transmit a peak suppression information message (PSIM) that includes the peak suppression information to a receiving device such as a user equipment (UE). The peak suppression information may include amplitude information, position information, and phase information associated with the clipped amplitude peaks of the transmitted data signal. The peak suppression information may enable the receiving device to reconstruct the original time-domain data signal from the clipped version, and ultimately reconstruct the data message. The transmitting device may transmit the PSIM in control signaling, such as a physical downlink control channel (PDCCH) transmission. The PSIM consumes resources in the control signaling.

In accordance with innovative aspects of the subject matter described in this disclosure, a transmitting device may reduce a channel overhead of a PSIM by reducing amplitude signaling of clipped peaks of a data signal. To avoid including amplitude information for each clipped peak of a time-domain data signal in a PSIM, the transmitting device may subtract a constant amplitude offset from at least some if not each peak above a clipping threshold in the time-domain data signal. The transmitting device may indicate the amplitude offset in the PSIM, and the receiving device may reconstruct the data message based on the indication of the amplitude offset in the PSIM. In some examples, the transmitting device may indicate a PAPR in the PSIM, such as a PAPR of a maximum peak in the data signal. Based on the indication of the PAPR, the receiving device may perform a calculation (for example, a root mean square (RMS) calculation) to determine the amplitude offset for reconstructing the data message and may subsequently reconstruct and decode the data message.

In some examples, the transmitting device may determine the amplitude offset (for example, a constant amplitude offset) for a portion of the data signal corresponding to a duration. The duration may include one or more of a symbol (for example, an orthogonal frequency division multiplexing (OFDM) symbol), a slot, or a subframe. Additionally or alternatively, the duration may correspond to a length of the entire data message. In some examples, the transmitting device may indicate a first amplitude offset for a first portion of a data message corresponding to a first duration, and a second amplitude offset for a second portion of the data message corresponding to a second duration. In some examples, the first duration represents a first period of time, and the second duration represents a second period of time different than the first period of time.

Particular implementations of the subject matter described in this disclosure can be implemented to realize one or more of the following potential advantages. The techniques employed by the described communication devices (for example, the base station and the UE) may provide benefits and enhancements to the operation of the communication devices, such as reduced latency, reduced PAPR, and improved reliability. For example, a transmitting device may reduce amplitude signaling in the PSIM by subtracting the constant amplitude offset from peaks above the clipping threshold, which may enable the transmitting device to transmit the PSIM with reduced latency.

Aspects of the disclosure are initially described in the context of wireless communications systems. Additional aspects of the disclosure are described in the context of a data signal processing chain, polar clipping schemes, and a process flow. Aspects of the disclosure are further illustrated by and described with reference to apparatus diagrams, system diagrams, and flowcharts that relate to reducing amplitude signaling overhead in peak suppression information.

FIG. 1 illustrates an example of a wireless communications system 100 that supports reducing amplitude signaling overhead in peak suppression information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support one or more of enhanced broadband communications, ultra-reliable (for example, mission critical) communications, low latency communications, or communications with low-cost and low-complexity devices.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, one or both of the order of the modulation scheme or the coding rate of the modulation scheme). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time-domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time-domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying one or both of amplitude offsets or phase offsets to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use one or both of error detection techniques or error correction techniques to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback. For example, the device may provide HARQ feedback in a specific slot for data received in a previous symbol in the slot. In other cases, the device may provide HARQ feedback in a subsequent slot, or according to some other time interval.

In some examples, to reduce PAPR, a transmitting device (for example, a base station 105) may clip peaks corresponding to data samples of a time-domain data signal to reduce the amplitudes associated with the respective data samples such that they are below a clipping threshold or peak amplitude threshold. For example, a transmitting device may perform an inverse fast Fourier transform (IFFT) on a frequency-domain representation of a data message to obtain a time-domain data signal that includes data samples representing the data message in the time-domain. The transmitting device may then clip (for example, remove) peaks of the time-domain data signal by reducing the amplitudes of the respective data samples to below the clipping threshold or peak amplitude threshold. In some examples, the transmitting device may subtract a portion of the amplitude of a peak to reduce the amplitude to below the clipping threshold.

The transmitting device may generate peak suppression information associated with the clipped peaks and may transmit a PSIM that includes the peak suppression information to a receiving device such as a UE 115. The peak suppression information may enable the receiving device to reconstruct the original time-domain data signal from the clipped version and ultimately reconstruct the data message. The transmitting device may transmit the PSIM in control signaling, such as a PDCCH transmission. The PSIM may consume resources in the control signaling. In some cases, using other techniques different than those described herein, the PSIM may include 2 bits of amplitude information for each clipped peak, which may lead to high overhead in the control signaling.

According to the techniques described herein, a transmitting device may reduce a channel overhead of a PSIM by reducing amplitude signaling of clipped peaks of a data signal. To avoid including amplitude information for each clipped peak of a time-domain data signal in a PSIM, the transmitting device may subtract an amplitude offset (for example, a constant amplitude offset) from each peak above a clipping threshold in the time-domain data signal. The transmitting device may indicate the amplitude offset in the PSIM, and the receiving device may reconstruct the data message based on the amplitude offset. In some examples, the transmitting device may indicate a PAPR in the PSIM, such as a PAPR of a maximum peak in the data signal. Based on the indicated PAPR, the receiving device may perform a calculation (for example, an RMS calculation) to determine the amplitude offset for reconstructing the data message and may reconstruct and decode the data message, which may lead to more efficient and effective signaling, including reducing signaling overhead, among other benefits.

Figure 2:
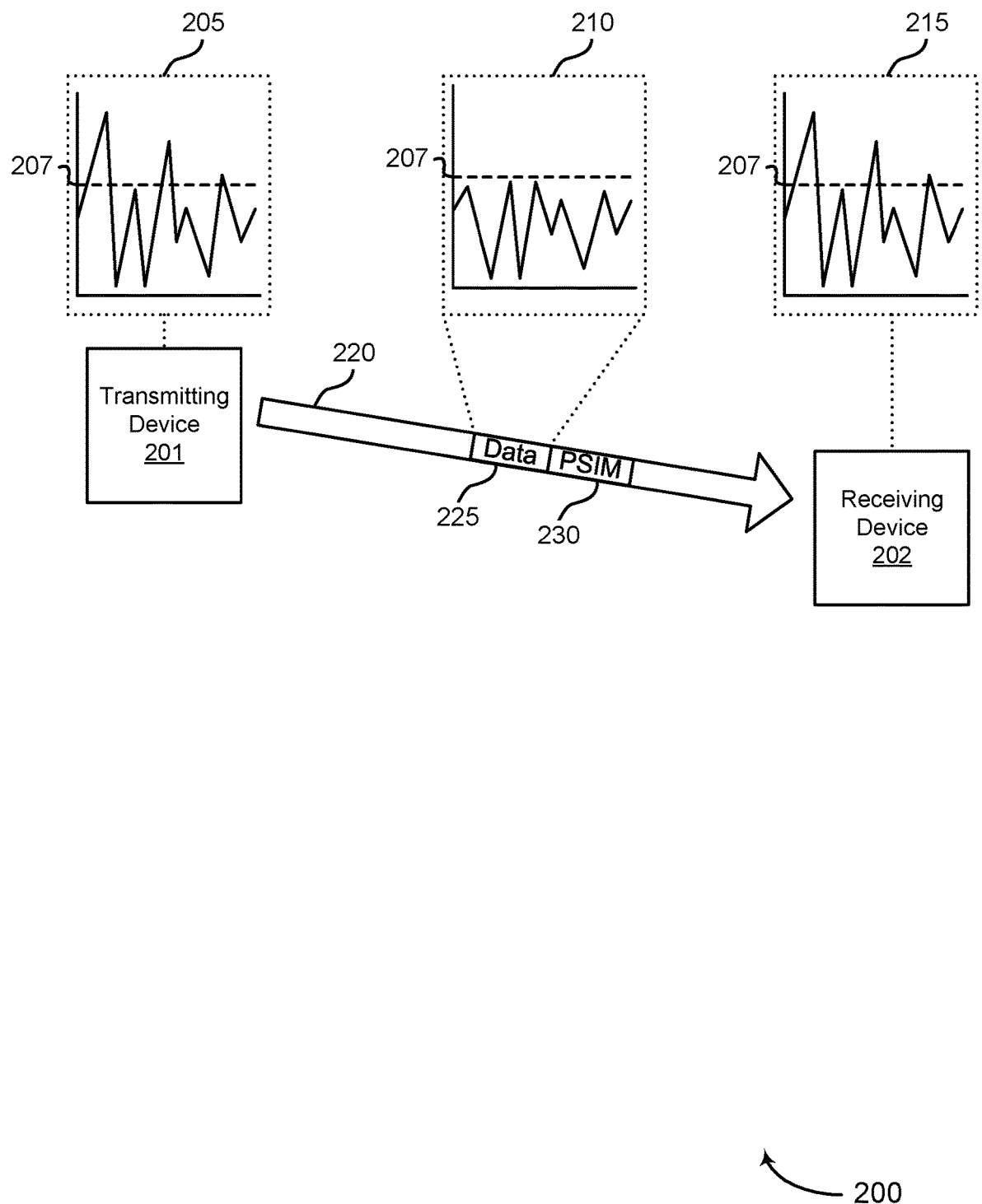

FIG. 2 illustrates an example of a wireless communications system 200 that supports reducing amplitude signaling overhead in peak suppression information in accordance with aspects of the present disclosure. In some examples, the wireless communications system 200 may implement aspects of wireless communications system 100. For example, the wireless communications system 200 may include a transmitting device 201 and a receiving device 202, each of which may be an example of a base station 105 or a UE 115 as described with reference to FIG. 1. The wireless communications system 200 may illustrate an example of various communications 220 (for example, downlink or uplink communications) between the transmitting device 201 and the receiving device 202.

The transmitting device 201 may generate a data signal 205 with multiple peaks (for example, amplitude peaks) above a clipping threshold 207 (for example, above an amplitude peak threshold). The data signal 205 may be a time-domain representation of a portion of a data message associated with a duration (for example, one or more of a symbol, a slot, or a subframe, among other examples). To reduce a PAPR of the data signal 205 in the duration, among other changes, the transmitting device 201 may clip (for example, reduce) peaks of the data signal 205 above the clipping threshold 207 by subtracting an amplitude offset, such as a constant amplitude offset, from each detected peak above the clipping threshold 207 in the data signal 205 to produce a clipped data signal 210. Further details of the clipping procedure may be described with reference to FIG. 3. The transmitting device 201 may transmit the clipped data signal 210 to the receiving device 202. In some cases, the transmitting device 201 may transmit the clipped data signal 210 via a data channel 225 (for example, in a physical downlink shared channel (PDSCH) transmission).

The receiving device 202, upon receiving the clipped data signal 210, may perform one or more procedures to generate (for example, reconstruct) a reconstructed data signal 215, which may be an approximate reconstruction of the data signal 205. The receiving device 202 may perform such one or more reconstruction procedures for the clipped data signals 210 with clipped peaks. In some examples, the one or more reconstruction procedures may involve the receiving device 202 receiving a PSIM 230 that indicates a location of one or more of the clipped peaks. In some examples, the PSIM 230 may further indicate a phase of the one or more clipped peaks. In some examples, the one or more reconstruction procedures may include the receiving device 202 receiving control signaling indicating a clipping threshold 207. The receiving device 202 may use the clipped data signal 210, the PSIM 230, and the clipping threshold 207 to generate the reconstructed data signal 215.

Generally, the transmitting device 201 may transmit control signaling via a control channel (for example, in a PDCCH transmission or over a dedicated control channel) or in a control message multiplexed on the data channel 225. In some examples, the control signaling may further include an indication of the clipping threshold 207, an indication that PSIMs 230 are being used, or an indication of a quantity or subset of peaks above the clipping threshold 207 included in a PSIM 230, among other examples. As used herein, control signaling may generally refer to PDCCH signaling, downlink control information (DCI), MAC control element (CE) signaling, or RRC signaling, among other examples. The transmitting device 201 may transmit the PSIM 230 in control signaling, such as a PDCCH transmission.

In some cases, using other techniques different than those described herein, the PSIM 230 may consume an inefficient amount of resources in the control signaling. For example, the PSIM 230 may include 2 bits of amplitude information to indicate an amplitude offset for each clipped peak, which may lead to high overhead in the control signaling and reduced communications efficiency.

In accordance with innovative aspects of the subject matter described in this disclosure and in contrast to the other techniques, the transmitting device 201 may reduce a channel overhead of the PSIM 230 by reducing amplitude signaling of the clipped or chopped-off peaks of the data signal 205. To avoid including in the PSIM 230 amplitude information for each clipped peak of the data signal 205, the transmitting device 201 may subtract a constant amplitude offset from each peak above the clipping threshold 207 in the data signal 205. The transmitting device 201 may indicate the amplitude offset in the PSIM 230, and the receiving device 202 may generate the reconstructed data signal 215 based on the amplitude offset. In some examples, the transmitting device 201 may indicate a PAPR in the PSIM 230, such as a PAPR of a maximum peak in the data signal. Based on the indicated PAPR, the receiving device 202 may perform a calculation (for example, an RMS calculation) to determine the amplitude offset for generating the reconstructed data signal 215 and may reconstruct and decode the reconstructed data signal 215.

Figure 3:
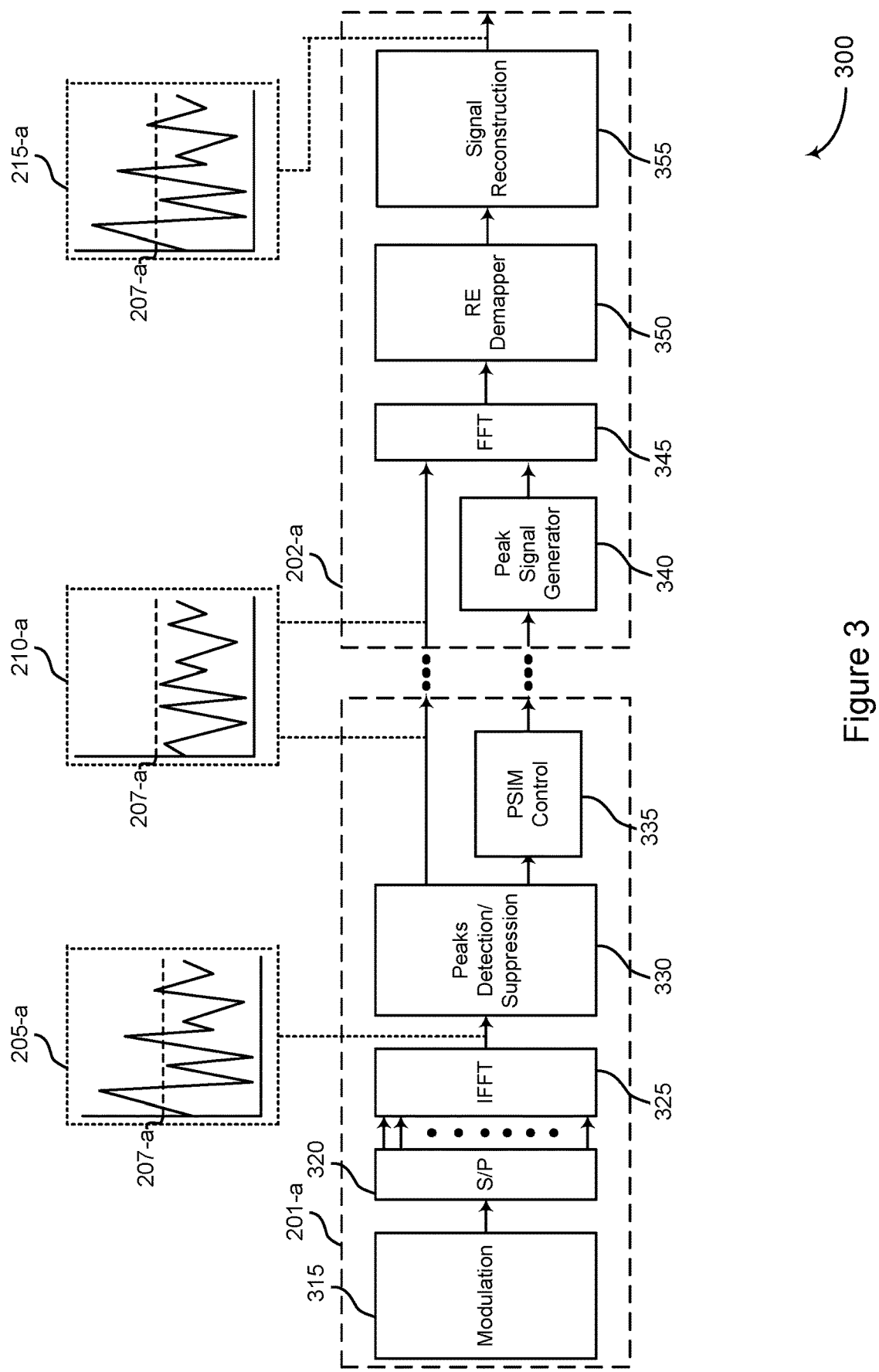
FIG. 3 illustrates an example of a data signal processing chain that supports reducing amplitude signaling overhead in peak suppression information in accordance with aspects of the present disclosure.

FIG. 3 illustrates an example of a data signal processing chain 300 that supports reducing amplitude signaling overhead in peak suppression information in accordance with aspects of the present disclosure. In some examples, the data signal processing chain 300 may implement or may be implemented by aspects of the wireless communications system 100 or the wireless communications system 200. For example, the data signal processing chain 300 may illustrate components of a transmitting device 201-a and a receiving device 202-a, which may be examples of corresponding devices described with reference to FIGS. 1 and 2. The transmitting device 201-a may transmit a data signal to the receiving device 202-a in accordance with one or more aspects of the techniques described herein.

The transmitting device 201-a may use a modulation component 315 to produce a signal. The signal may represent a portion of a data message corresponding to a duration (for example, one or more of a symbol, a slot, or a subframe, among other examples). In some examples, the modulation component 315 may map symbols stored at the transmitting device 201-a to signals with a particular amplitude and phase. As such, the modulation component 315 may produce a frequency-domain representation of the data message according to the amplitude and phase associated with each symbol to be transmitted. The modulation component 315 may apply a precoding matrix to the signal. The modulation component 315 may output the signal to a serial-to-parallel (S/P) component 320, which may perform serial to parallel conversion on the signal, and may output the converted signal to an IFFT component 325. The IFFT component 325 may perform IFFT on the converted signal and may output a data signal 205-a in the time-domain to a peak detection and suppression component 330. In some examples, the data signal 205-a may be an example of a data signal 205 as described with reference to FIG. 2. The data signal 205-a may have one or more peaks above a clipping threshold 207-a.

The peak detection and suppression component 330 may detect the peaks (for example, amplitude peaks) of the data signal 205-a. For instance, the peak detection and suppression component 330 may detect each of the peaks of the data signal 205-a and may determine which of the peaks are above the clipping threshold 207-a (for example, above an amplitude peak threshold). Additionally or alternatively, the transmitting device 201-a may detect only the peaks that are above the clipping threshold 207-a, rather than each of the peaks of the data signal 205-a. In either case, the peak detection and suppression component 330 may clip off (for example, reduce) the detected peaks of the in-phase quadrature (IQ) samples of the data signal 205-a passing the clipping threshold 207-a by subtracting a constant amplitude offset from each detected peak above the clipping threshold 207-a in the data signal 205-a to produce a clipped data signal 210-a, which may be an example of a clipped data signal 210 as described with reference to FIG. 2. In some examples, the transmitting device 201-a may determine a PAPR, such as a PAPR of a maximum peak in the data signal 205-a. Based on the identified PAPR, the transmitting device 201-a may perform a calculation (for example, an RMS calculation) to determine the amplitude offset to be applied by the peak detection and suppression component 330 for clipping the detected peaks. The transmitting device 201-a may transmit the clipped data signal 210-a to the receiving device 202-a.

A PSIM control component 335 may select which peaks of the data signal 205-a above the clipping threshold 207-a to indicate to the receiving device 202-a via a PSIM. In some implementations, the PSIM control component 335 may select or determine a subset of the peaks clipped from the data signal 205-a (for example, a subset of the total number of peaks above the clipping threshold 207-a). The transmitting device 201-a may transmit the PSIM to the receiving device 202-a after selecting the subset of the peaks clipped from the data signal 205-a. The PSIM may indicate each location of a clipped peak sample for the subset of the peaks clipped from the data signal 205-a. The PSIM may also indicate the amplitude offset. For example, the PSIM may indirectly or implicitly indicate the amplitude offset by identifying the PAPR of the data signal 205-a, which the receiving device 202-a may use to calculate the amplitude offset. In some examples, the PSIM may indicate each phase of a clipped peak sample for the subset of the peaks clipped from the data signal 205-a.

A peaks signal generator 340 may receive the PSIM, decode the PSIM, and may generate peak signals (for example, signals including the indicated peaks) according to the peak suppression information in the PSIM. For example, the peaks signal generator 340 may generate samples that include the indicated peaks, and may reconstruct the peak signals using the generated samples. In some examples, the peaks signal generator 340 may perform the RMS calculation to determine the amplitude offset for the indicated peaks. In some examples, the peaks signal generator 340 may apply a fast Fourier transform (FFT) (for example, in conjunction with an FFT component 345) to the peaks signal. The peaks signal generator 340 or the FFT component 345 may transmit or pass the peaks signal in the frequency-domain to a resource element (RE) demapper 350. In some examples, the RE demapper 350 may receive the clipped data signal 210-a and may perform an FFT on the clipped data signal 210-a to acquire the clipped data signal 210-a in the frequency-domain. The RE demapper 350 may perform a channel estimation of the clipped data signal 210-a, equalize a channel of the clipped data signal 210-a, expand the channel of the clipped data signal 210-a to obtain a full channel, and revert or undo the precoding matrix applied by the modulation component 315.

A signal reconstruction component 355 may combine the clipped data signal 210-a and the peaks signal (for example, after performing the channel estimation, equalizing the channel, expanding the channel, and reverting the precoding matrix). Based on the combining, the signal reconstruction component 355 may output a reconstructed data signal 215-a, which may be an example of a reconstructed data signal 215 as described with reference to FIG. 2. The reconstructed data signal 215-a may be an approximate reconstruction of the data signal 205-a.

Figure 4A:
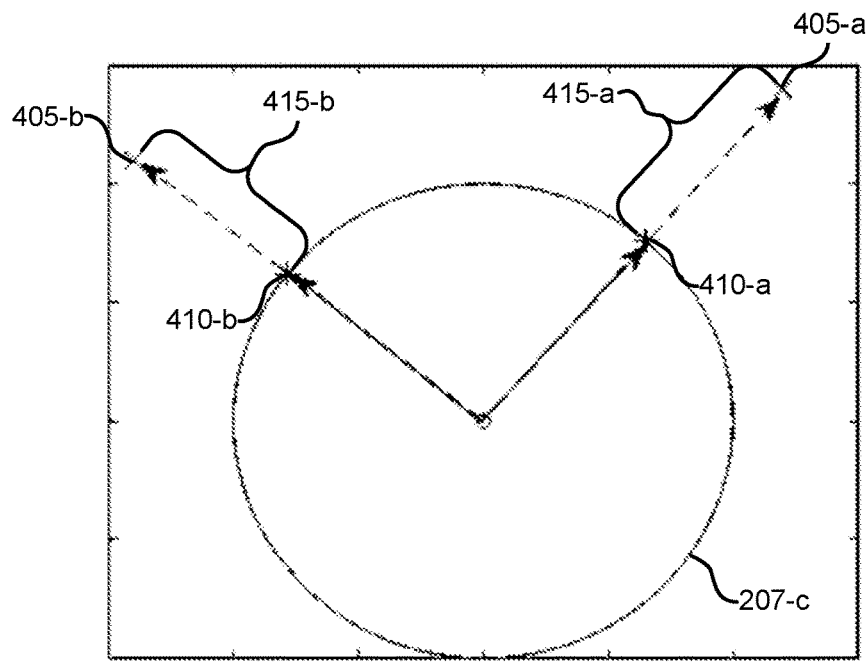
FIGS. 4A and 4B illustrate examples of polar clipping schemes that support reducing amplitude signaling overhead in peak suppression information in accordance with aspects of the present disclosure.
Figure 4B:
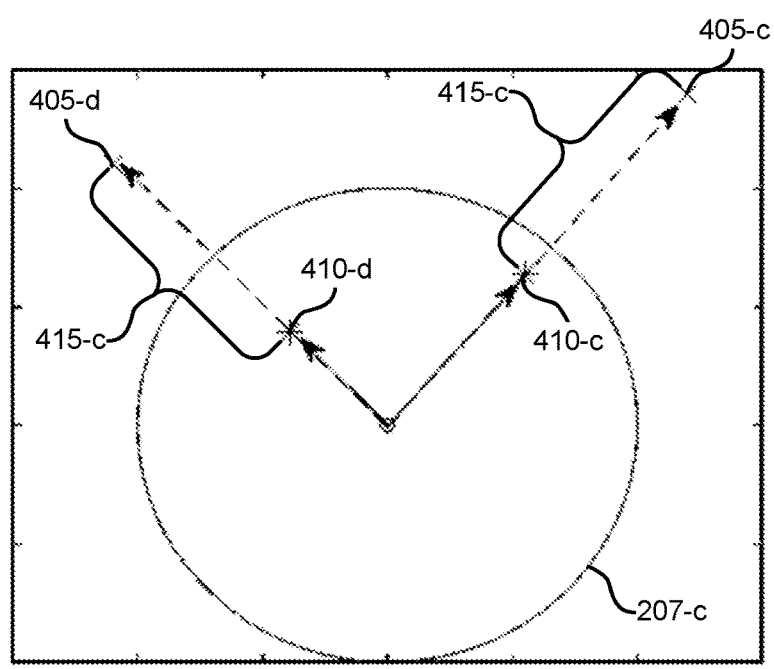

FIGS. 4A and 4B illustrate examples of polar clipping schemes 400 that support reducing amplitude signaling overhead in peak suppression information in accordance with aspects of the present disclosure. In some examples, the polar clipping schemes 400 may implement or may be implemented by aspects of the wireless communications system 100 or the wireless communications system 200. For example, each polar clipping scheme 400 may include peaks 405 of a data signal transmitted by a transmitting device 201 to a receiving device 202 in accordance with one or more aspects of the techniques described herein. The data signal may correspond to a portion of a data message associated with a duration. In some examples, the duration may include one or more of a symbol, a slot, or a subframe, or the duration may be associated with the entire data message.

Each peak 405 may be a representation of a time-domain sample of the data signal plotted in a complex plane. The complex plane may include a real axis and a perpendicular imaginary axis. A peak 405 may be represented as a complex value $z_n = x_n + y_n i = r_n e^{j\theta_n}$. The value $x_n$ may represent a displacement of the complex value $z_n$ along the real axis of the complex plane. Similarly, the value $y_n$ may represent a displacement of the complex value $z_n$ along the imaginary axis of the complex plane. The value $r_n = \sqrt{x_n^2 + y_n^2}$ may represent an amplitude of the peak 405, and the value $\theta_n = \arctan(y_n/x_n)$ may represent a phase of the peak 405. The parameters i and j may represent an imaginary unit such that $i^2 = j^2 = -1$.

FIG. 4A illustrates an example of a polar clipping scheme 400-a, which may include peaks 405-a and 405-b of a data signal. The peaks 405-a and 405-b may be represented as complex values $z_a = r_a e^{j\theta_a}$ and $z_b = r_b e^{j\theta_b}$, respectively. The amplitudes $r_a$ and $r_b$ may be above a clipping threshold 207-c (for example, above an amplitude peak threshold). The clipping threshold 207-a may correspond to an amplitude $G_{max}$ in the complex plane. To reduce a PAPR of the data signal, a transmitting device 201 may clip or chop off the peaks 405-a and 405-b to obtain clipped peaks 410-a and 410-b, or may replace the peaks 405-a and 405-b in the data signal with the clipped peaks 410-a and 410-b. The clipped peaks 410-a and 410-b may each have the amplitude $G_{max}$ and maintain the respective phases of the peaks 405-a and 405-b. That is, the clipped peak 410-a may be represented by a complex value $z_{410-a} = G_{max} e^{j\theta_a}$ and the clipped peak 410-b may be represented by a complex value $z_{410-b} = G_{max} e^{j\theta_b}$.

In some cases, using other techniques different than those described herein, the transmitting device 201 may transmit, to the receiving device 202, a clipped data signal including the clipped peaks 410-a and 410-b. The transmitting device 201 may also transmit, to the receiving device 202, a PSIM indicating the locations of the clipped peaks 410 (for example, including the clipped peaks 410-a and 410-b) of the clipped data signal. In some examples, the PSIM may indicate each phase $\theta_n$ of the clipped peaks 410. The transmitting device may transmit the PSIM in control signaling, such as a PDCCH transmission. The PSIM may be transmitted on resources in the control signaling. In some cases, using other techniques different than those described herein, the PSIM may include amplitude information for each clipped peak 410. For example, the PSIM may include information for amplitude offsets 415-a and 415-b corresponding to the clipped peaks 410-a and 410-b. The amplitude offset 415-a may have a value equal to $r_a - G_{max}$, and the amplitude offset 415-b may have a value equal to $r_b - G_{max}$. The amplitude information in the PSIM may lead to high overhead in the control signaling.

In accordance with innovative aspects of the subject matter described in this disclosure, to avoid including amplitude information in the PSIM for each clipped peak 410 of a data signal, the transmitting device 201 may subtract a constant amplitude offset from each peak 405 above the clipping threshold 207-c in the data signal, as illustrated in FIG. 4B. FIG. 4B illustrates an example of a polar clipping scheme 400-b, which may include peaks 405-c and 405-d of the data signal. The peaks 405-c and 405-d may be represented as complex values $z_c = r_c e^{j\theta_c}$ and $z_d = r_d e^{j\theta_d}$, respectively. The amplitudes $r_c$ and $r_d$ may be above a clipping threshold 207-c. To reduce a PAPR of the data signal, the transmitting device 201 may clip or chop off the peaks 405-c and 405-d to obtain clipped peaks 410-c and 410-d, or may replace the peaks 405-c and 405-d in the data signal with the clipped peaks 410-c and 410-d.

The transmitting device 201 may generate the clipped peaks 410-c and 410-d by subtracting a constant amplitude offset 415-c from the amplitudes of each of the peaks 405-c and 405-d. The amplitude offset 415-c may have a value C. The clipped peaks 410-c and 410-d may be represented as complex values $z_{410-c} = (r_c - C)e^{j\theta_c}$ and $z_{410-d} = (r_d - C)e^{j\theta_d}$, respectively. More generally, the clipped peaks 410 may be represented as complex values $z_n = (r_n - C)e^{j\theta_n}$, $\forall n \in P$, in which the group P represents all peaks 405 above the clipping threshold 207-c.

In some examples, the transmitting device 201 may determine a PAPR, such as a PAPR of a maximum peak 405, in the data signal. The PAPR may have a value $PAPR_{max}$.

The transmitting device 201 may perform a calculation (for example, an RMS calculation) to determine the amplitude offset 415-c for clipping the peaks 405. For example, the transmitting device 201 may calculate the value C according to the Equation (1):

$$C = \sqrt{\frac{1}{N_{fft} - |P|} \sum_{m \notin P} |z_m|^2} \times 10^{\frac{PAPR_{max} - PAPR_{tgt}}{20}}. \quad (1)$$

The parameter $N_{fft}$ in Equation 1 may correspond to a number of samples of the data signal generated based on applying an FFT to the time-domain representation of the data signal. The complex values $z_m$ in Equation 1 may correspond to the complex values of samples not included in the group P. The parameter $PAPR_{tgt}$ in Equation 1 may correspond to a target PAPR for the clipped data signal (for example, 6 decibels (dB)).

In some examples, the transmitting device 201 may transmit, to the receiving device 202, a clipped data signal including the clipped peaks 410-c and 410-d. The transmitting device 201 may also transmit, to the receiving device 202, a PSIM indicating the location of each of the clipped peaks 410 (for example, including the clipped peaks 410-c and 410-d) of the clipped data signal. In some examples, the PSIM may indicate the phase $\theta_n$ of each of the clipped peaks 410. The transmitting device 201 may indicate the amplitude offset 415-c in the PSIM, and the receiving device 202 may reconstruct the data signal based on the amplitude offset 415-c. In some examples, the transmitting device 201 may indicate the parameter $PAPR_{max}$ in the PSIM. Based on the indicated $PAPR_{max}$, the receiving device 202 may perform a calculation (for example, the calculation illustrated in Equation 1) to determine the amplitude offset 415-c for reconstructing the data signal.

Figure 5:
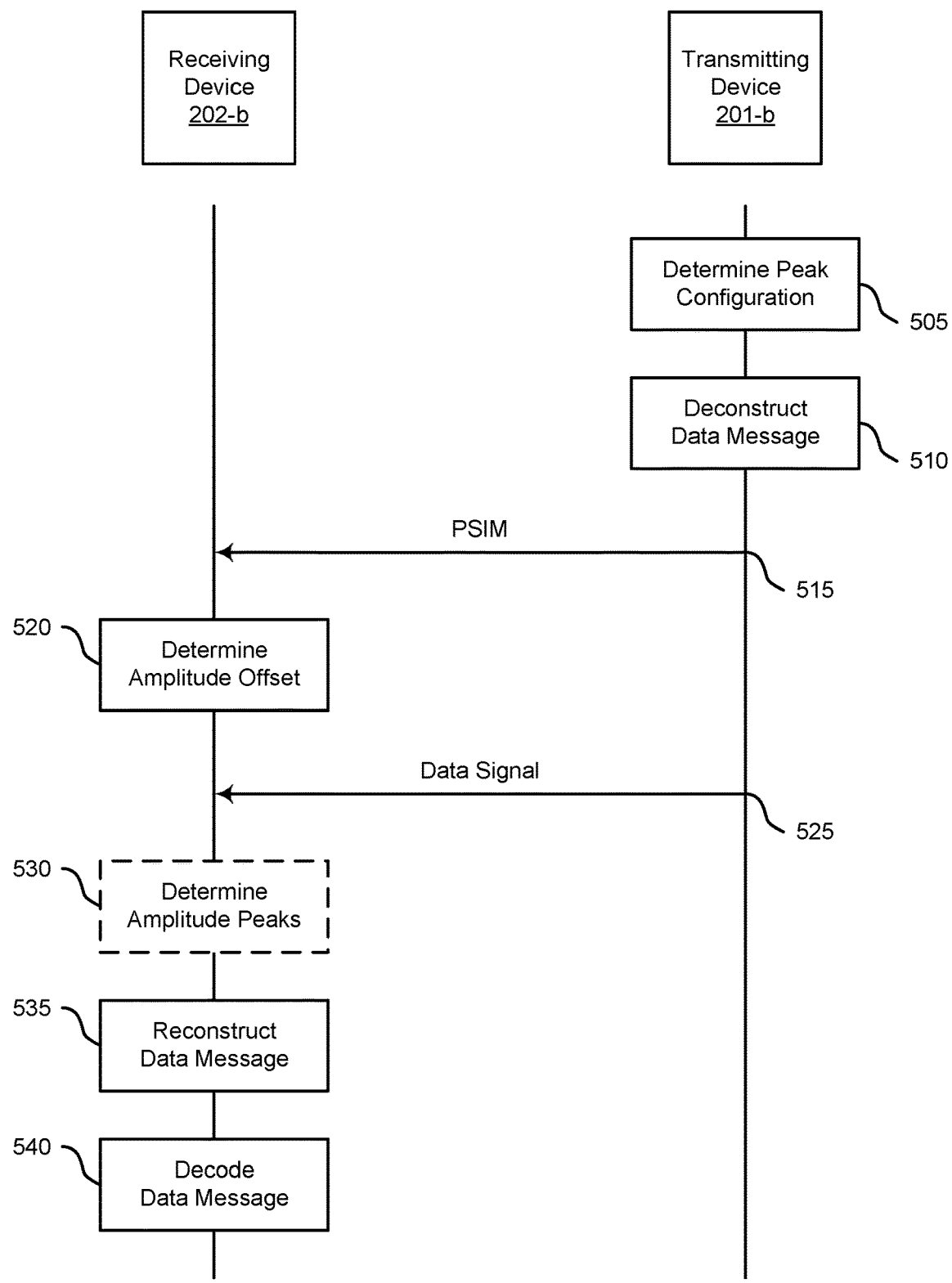
FIG. 5 illustrates an example of a process flow that supports reducing amplitude signaling overhead in peak suppression information in accordance with aspects of the present disclosure.

FIG. 5 illustrates an example of a process flow 500 that supports reducing amplitude signaling overhead in peak suppression information in accordance with aspects of the present disclosure. In some examples, the process flow 500 may implement or may be implemented by aspects of wireless communications systems 100 and 200. For example, the process flow 500 may include example operations associated with one or more of a transmitting device 201-b and a receiving device 202-b, which may be examples of corresponding devices described with reference to FIGS. 1 and 2. In the following description of the process flow 500, the operations between the transmitting device 201-b and the receiving device 202-b may be performed in a different order than the example order shown, or the operations performed by the transmitting device 201-b and the receiving device 202-b may be performed in different orders or at different times. Some operations may also be omitted from the process flow 500, and other operations may be added to the process flow 500. The operations performed by the transmitting device 201-b and the receiving device 202-b may support improvement to data transmission operations and, in some examples, may promote improvements to data decoding processes, among other benefits.

At 505, the transmitting device 201-b may determine a peak configuration for a portion of a data message corresponding to a duration. For example, the transmitting device 201-b may generate a data signal with multiple peaks (for example, amplitude peaks) above a clipping threshold (for example, above an amplitude peak threshold). The transmitting device 201-b may detect each of the peaks of the data signal and may determine which of the peaks are above the clipping threshold. Additionally or alternatively, the transmitting device 201-b may detect only the peaks that are above the clipping threshold, rather than each of the peaks of the data signal. The peak configuration may include the detected peaks of the data signal.

The data signal may correspond to the portion of the data message. In some examples, the duration may include one or more of a symbol, a slot, or a subframe. Additionally or alternatively, the duration may correspond to the entire data message. In some examples, the transmitting device 201-b may determine a PAPR in the peak configuration, such as a PAPR of a maximum peak in the data signal.

At 510, the transmitting device 201-b may deconstruct the portion of the data message into a data signal and a PSIM. The PSIM may include peak suppression information associated with the data signal. The transmitting device 201-b may adjust the data signal based on an amplitude offset associated with the peak configuration. In some examples, to reduce a PAPR of the data signal, the transmitting device 201-b may clip or chop off peaks of the portion of the data message above the clipping threshold by subtracting a constant amplitude offset from each peak above the clipping threshold in the portion of the data message to produce the data signal. In some examples, the transmitting device 201-b may perform a calculation (for example, an RMS calculation, such as the calculation illustrated in Equation 1) to determine the amplitude offset for adjusting the data signal. The transmitting device 201-b may determine the amplitude offset based on the determined PAPR in the peak configuration.

At 515, the transmitting device 201-b may transmit the PSIM to the receiving device 202-b. The PSIM may indicate each location of a clipped peak sample for the subset of the peaks clipped from the portion of the data message. The PSIM may also indicate the amplitude offset. For example, the PSIM may implicitly indicate the amplitude offset by including the determined PAPR in the peak configuration. In some examples, the PSIM may indicate each phase of a clipped peak sample for the subset of the peaks clipped from the portion of the data message. The receiving device 202-b may receive and decode the PSIM to determine the peak suppression information associated with the data signal.

At 520, the receiving device 202-b may determine the amplitude offset for adjusting the data signal. In some examples, the receiving device may perform a calculation (for example, the RMS calculation illustrated in Equation 1) to determine the amplitude offset based on the PAPR included in the PSIM. At 525, the transmitting device 201-b may transmit the data signal to the receiving device 202-b in the duration.

In some examples, at 530, the receiving device 202-b may determine that the peak suppression information in the PSIM corresponds to a subset of amplitude peaks (in other words, the clipped peaks) of the data signal. In some examples, the receiving device may generate peak signals (for example, signals including the indicated peaks) according to the peak suppression information in the PSIM.

At 535, the receiving device 202-b may reconstruct the portion of the data message by adjusting or modifying the data signal based on the amplitude offset. In some examples, the receiving device 202-b may add the amplitude offset to the clipped peaks to reconstruct the portion of the data message. For example, the receiving device 202-b may combine the data signal and the peak signals to reconstruct the portion of the data message. At 540, the receiving device 202-b may decode the reconstructed portion of the data message.

Figure 6:
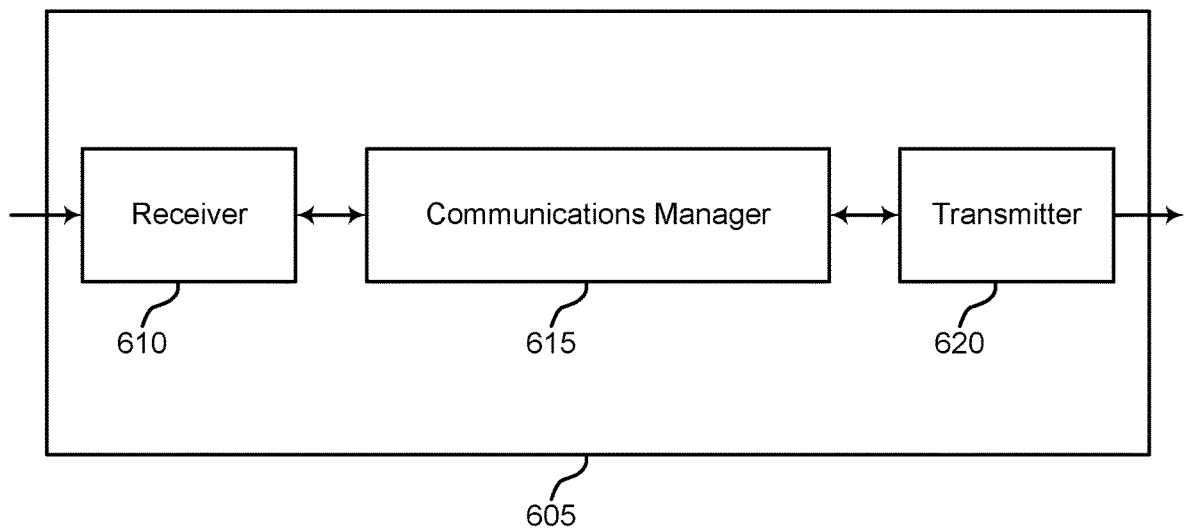
FIGS. 6 and 7 show block diagrams of devices that support reducing amplitude signaling overhead in peak suppression information in accordance with aspects of the present disclosure.

FIG. 6 shows a block diagram of a device 605 that supports reducing amplitude signaling overhead in peak suppression information in accordance with aspects of the present disclosure. The device 605 may be an example of aspects of a receiving device 202 as described with reference to FIG. 2. The device 605 may include a receiver 610, a communications manager 615, and a transmitter 620. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to reducing amplitude signaling overhead in peak suppression information, among other examples). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a message including peak suppression information corresponding to a duration, determine a constant amplitude offset for adjusting a signal based on the peak suppression information, receive a data signal in the duration, reconstruct at least a portion of a data message by adjusting the data signal based on the constant amplitude offset, and decode the reconstructed portion of the data message.

The communications manager 615 as described herein may be implemented to realize one or more potential advantages. One implementation may allow the device 605 to save power by communicating with a transmitting device (for example, a transmitting device 201 as described herein) more efficiently. For example, the device 605 may efficiently receive data from the transmitting device based on reconstructing the portion of the data message, as the device 605 may be able to increase a probability of successfully decoding information from the transmitting device, which may reduce or eliminate unnecessary or failed communications from the transmitting device.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
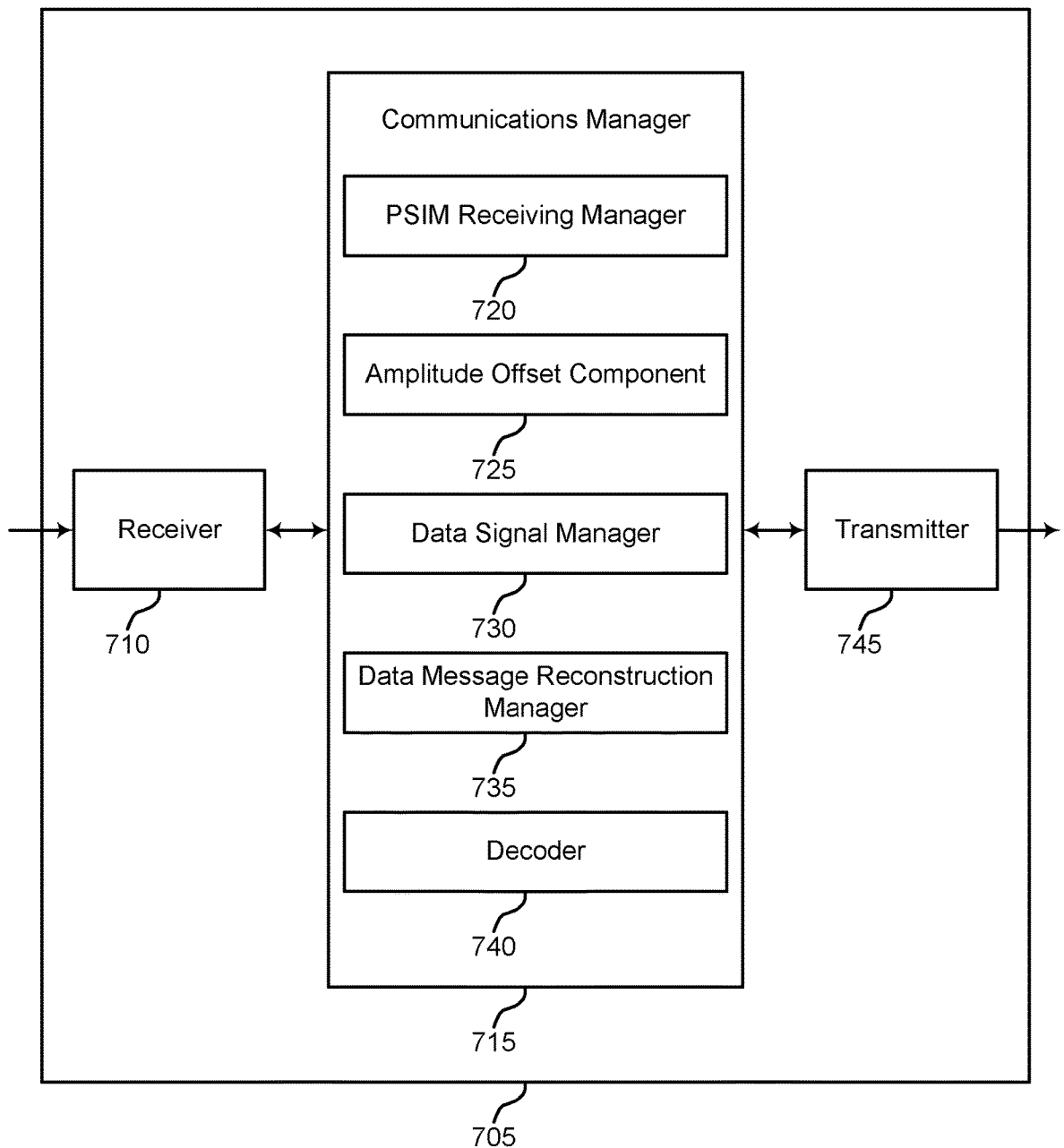

FIG. 7 shows a block diagram of a device 705 that supports reducing amplitude signaling overhead in peak suppression information in accordance with aspects of the present disclosure. The device 705 may be an example of aspects of a device 605, or a receiving device 202 as described herein. The device 705 may include a receiver 710, a communications manager 715, and a transmitter 745. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to reducing amplitude signaling overhead in peak suppression information, among other examples). Information may be passed on to other components of the device 705. The receiver 710 may be an example of aspects of the transceiver 920 described with reference to FIG. 9. The receiver 710 may utilize a single antenna or a set of antennas.

The communications manager 715 may include a PSIM receiving manager 720, an amplitude offset component 725, a data signal manager 730, a data message reconstruction manager 735, and a decoder 740.

The PSIM receiving manager 720 may receive a message including peak suppression information corresponding to a duration.

The amplitude offset component 725 may determine a constant amplitude offset for adjusting a signal based on the peak suppression information.

The data signal manager 730 may receive a data signal in the duration.

The data message reconstruction manager 735 may reconstruct at least a portion of a data message by adjusting the data signal based on the constant amplitude offset.

The decoder 740 may decode the reconstructed portion of the data message.

The transmitter 745 may transmit signals generated by other components of the device 705. In some examples, the transmitter 745 may be collocated with a receiver 710 in a transceiver component. For example, the transmitter 745 may be an example of aspects of the transceiver 920 described with reference to FIG. 9. The transmitter 745 may utilize a single antenna or a set of antennas.

Figure 8:
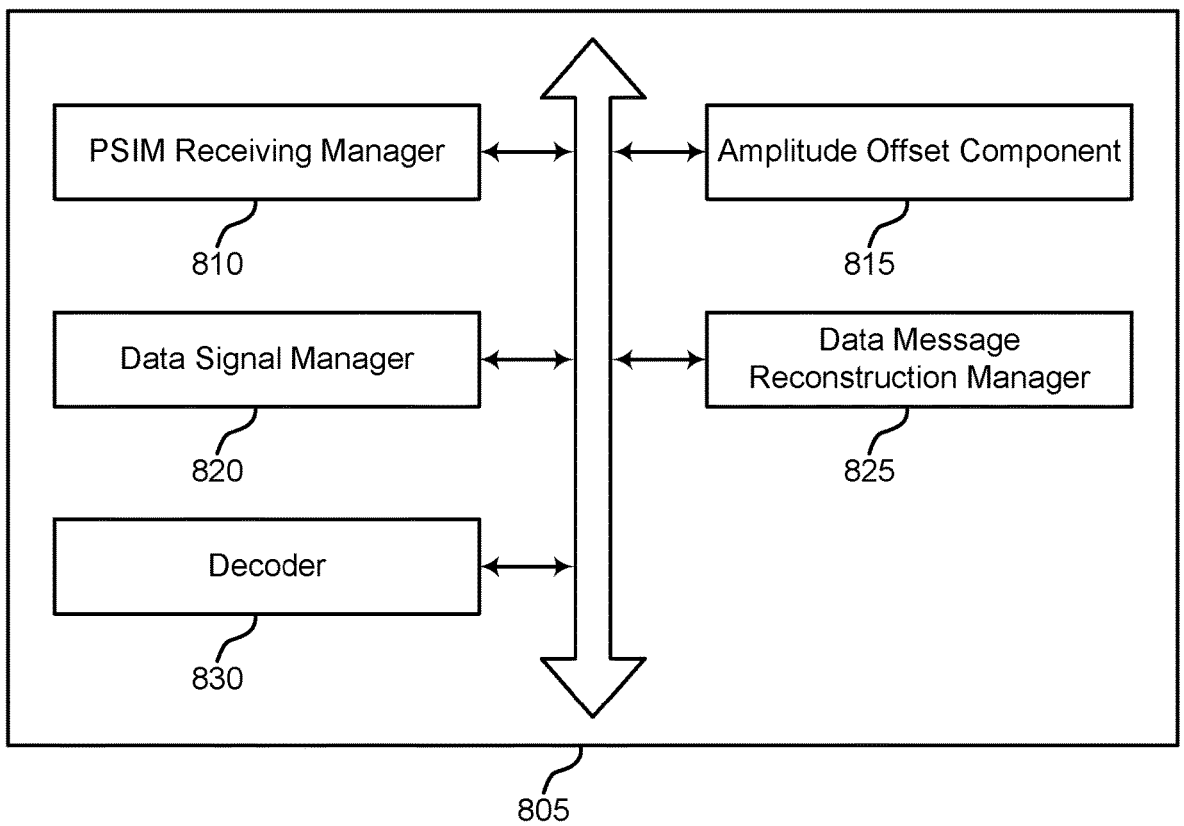
FIG. 8 shows a block diagram of a communications manager that supports reducing amplitude signaling overhead in peak suppression information in accordance with aspects of the present disclosure.

FIG. 8 shows a block diagram of a communications manager 805 that supports reducing amplitude signaling overhead in peak suppression information in accordance with aspects of the present disclosure. The communications manager 805 may be an example of aspects of a communications manager 615, a communications manager 715, or a communications manager 910 described herein. The communications manager 805 may include a PSIM receiving manager 810, an amplitude offset component 815, a data signal manager 820, a data message reconstruction manager 825, and a decoder 830. Each of these components may communicate, directly or indirectly, with one another (for example, via one or more buses).

The PSIM receiving manager 810 may receive a message including peak suppression information corresponding to a duration. In some examples, the duration includes one or more of a symbol, a slot, or a subframe. In some examples, the peak suppression information includes one or more of position information associated with one or more peaks of the data signal or phase information associated with one or more peaks of the data signal.

The amplitude offset component 815 may determine a constant amplitude offset for adjusting a signal based on the peak suppression information.

In some examples, the amplitude offset component 815 may determine a peak to average power ratio from the peak suppression information, where determining the amplitude offset is based on determining the peak to average power ratio.

In some examples, the amplitude offset component 815 may determine the threshold amplitude based on a configuration at the receiving device or the message including the peak suppression information.

In some examples, the amplitude offset component 815 may perform a root mean square calculation associated with the data signal, where the amplitude offset is determined based on the root mean square calculation. In some examples, the constant amplitude offset is subtracted from each amplitude peak of the subset of amplitude peaks. In some examples, the subset of amplitude peaks include amplitude peaks of the data signal above a threshold amplitude.

The data signal manager 820 may receive a data signal in the duration.

The data message reconstruction manager 825 may reconstruct at least a portion of a data message by adjusting the data signal based on the constant amplitude offset.

In some examples, the data message reconstruction manager 825 may determine that the peak suppression information corresponds to a subset of amplitude peaks of the data signal, where reconstructing at least the portion of the data message is based on determining that the peak suppression information corresponds to the subset of amplitude peaks of the data signal.

In some examples, the data message reconstruction manager 825 may adjust the subset of amplitude peaks using the amplitude offset based on determining that the peak suppression information corresponds to the subset of amplitude peaks of the data signal.

The decoder 830 may decode the reconstructed portion of the data message.

Figure 9:
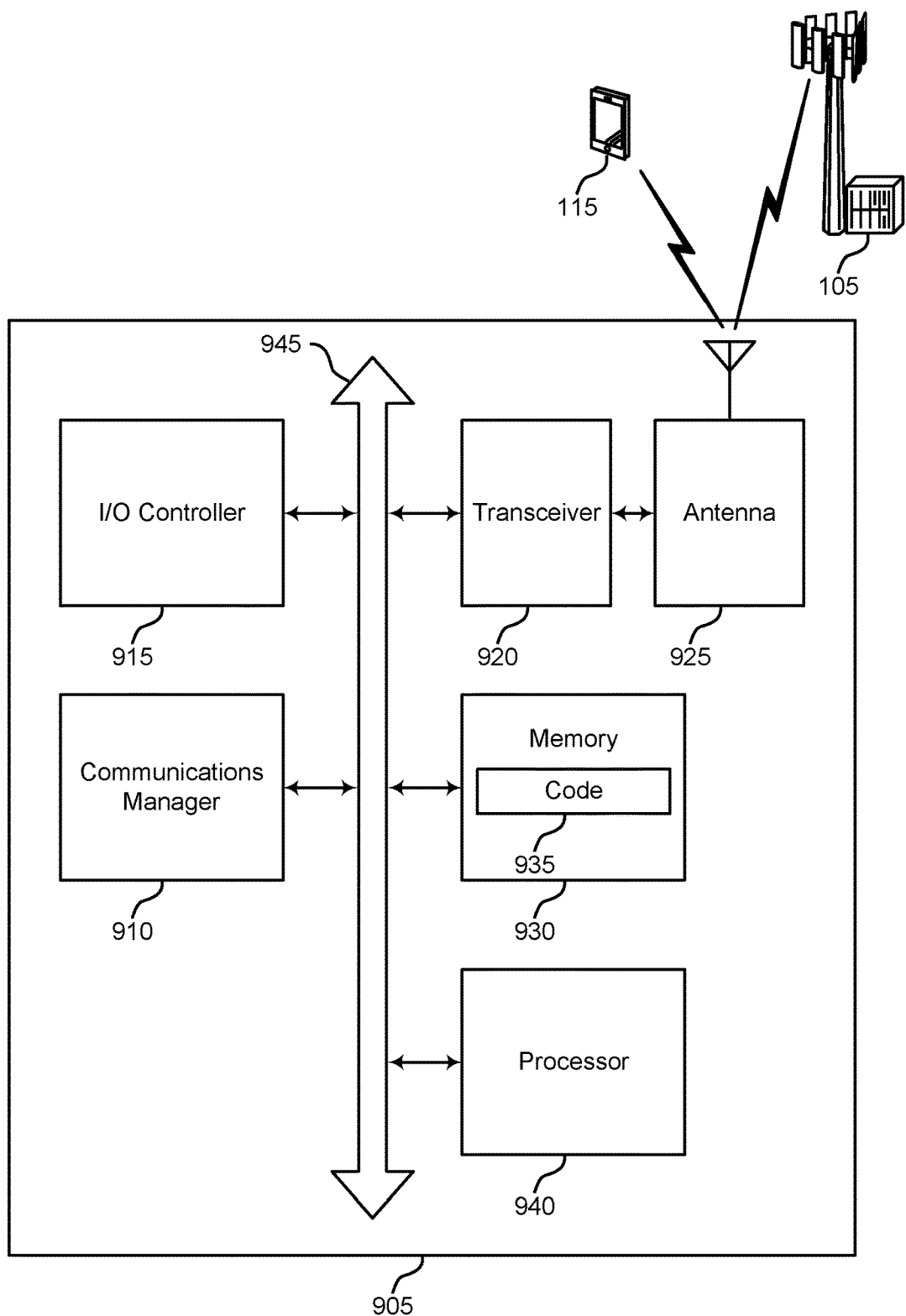
FIG. 9 shows a diagram of a system including a device that supports reducing amplitude signaling overhead in peak suppression information in accordance with aspects of the present disclosure.

FIG. 9 shows a diagram of a system 900 including a device 905 that supports reducing amplitude signaling overhead in peak suppression information in accordance with aspects of the present disclosure. The device 905 may be an example of or include the components of device 605, device 705, or a receiving device 202 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (for example, bus 945).

The communications manager 910 may receive a message including peak suppression information corresponding to a duration, determine a constant amplitude offset for adjusting a signal based on the peak suppression information, receive a data signal in the duration, reconstruct at least a portion of a data message by adjusting the data signal based on the constant amplitude offset, and decode the reconstructed portion of the data message.

The I/O controller 915 may manage input and output signals for the device 905. The I/O controller 915 may also manage peripherals not integrated into the device 905. In some examples, the I/O controller 915 may represent a physical connection or port to an external peripheral. In some examples, the I/O controller 915 may utilize an operating system such as iOS®, ANDROID®, MS-DOS®, MS-WINDOWS®, OS/2®, UNIX®, LINUX®, or another known operating system. In other examples, the I/O controller 915 may represent or interact with a modem, a keyboard, a mouse, a touchscreen, or a similar device. In some examples, the I/O controller 915 may be implemented as part of a processor. In some examples, a user may interact with the device 905 via the I/O controller 915 or via hardware components controlled by the I/O controller 915.

The transceiver 920 may communicate bi-directionally, via one or more antennas, wired, or wireless links. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some examples, the wireless device may include a single antenna 925. However, in some examples, the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some examples, the memory 930 may contain, among other things, a basic input/output system (BIOS) which may control basic hardware or software operation such as the interaction with peripheral components or devices.

The processor 940 may include an intelligent hardware device (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 940 may be configured to operate a memory array using a memory controller. In other examples, a memory controller may be integrated into the processor 940. The processor 940 may be configured to execute computer-readable instructions stored in a memory (for example, the memory 930) to cause the device 905 to perform various functions (for example, functions or tasks supporting reducing amplitude signaling overhead in peak suppression information).

The processor 940 of the device 905 may reduce power consumption and increase communication efficiency based on reconstructing the portion of the data message from the transmitting device. In some examples, the processor 940 of the device 905 may reconfigure parameters associated with processing the peak suppression information. For example, the processor 940 of the device 905 may turn on one or more processing units for determining the amplitude offset, increase a processing clock, or a similar mechanism within the device 905. As such, when subsequent data signals are received, the processor 940 may be ready to respond more efficiently through the reduction of a ramp up in processing power. The improvements in power saving and communication efficiency may further increase battery life at the device 905 (for example, by reducing or eliminating unnecessary or failed communications, among other examples).

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer (for example, when compiled and executed) to perform functions described herein.

Figure 10:
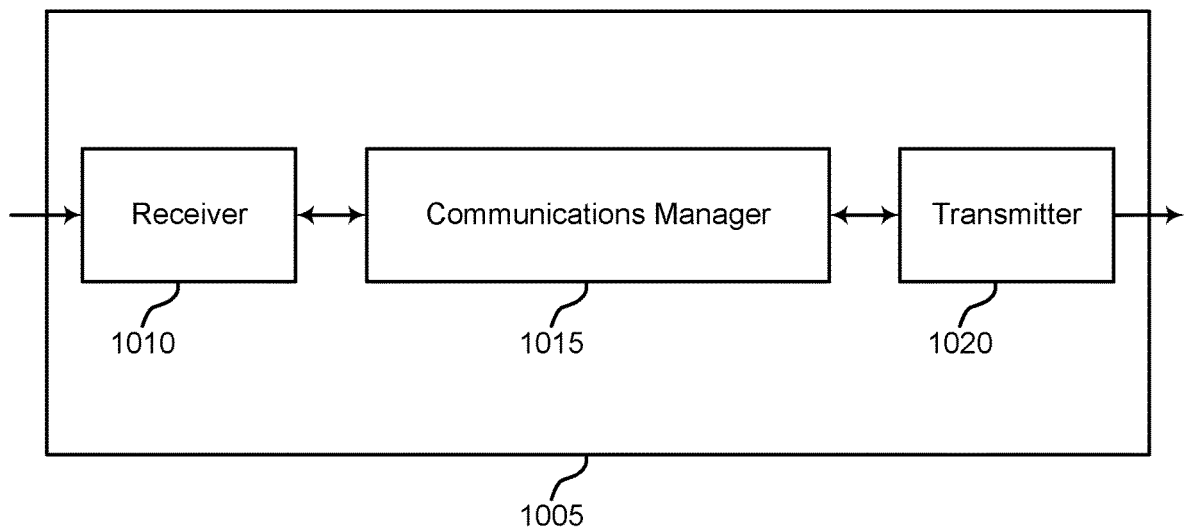
FIGS. 10 and 11 show block diagrams of devices that support reducing amplitude signaling overhead in peak suppression information in accordance with aspects of the present disclosure.

FIG. 10 shows a block diagram of a device 1005 that supports reducing amplitude signaling overhead in peak suppression information in accordance with aspects of the present disclosure. The device 1005 may be an example of aspects of a transmitting device 201 as described herein. The device 1005 may include a receiver 1010, a communications manager 1015, and a transmitter 1020. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to reducing amplitude signaling overhead in peak suppression information, among other examples). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine a peak configuration corresponding to a duration associated with at least a portion of a data message, deconstruct at least the portion of the data message into a data signal and peak suppression information by adjusting the data signal based on a constant amplitude offset associated with the peak configuration, and transmit the data signal in the duration and a message including the peak suppression information.

The communications manager 1015 as described herein may be implemented to realize one or more potential advantages. One implementation may allow the device 1005 to save power by communicating with a receiving device (for example, a receiving device 202 as described herein) more efficiently. For example, the device 1005 may efficiently transmit data by reducing a PAPR of transmissions, while also increasing the probability of the receiving device successfully decoding information from the transmitting device based on the indicated amplitude offset, which may reduce or eliminate unnecessary or failed communications from the transmitting device.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
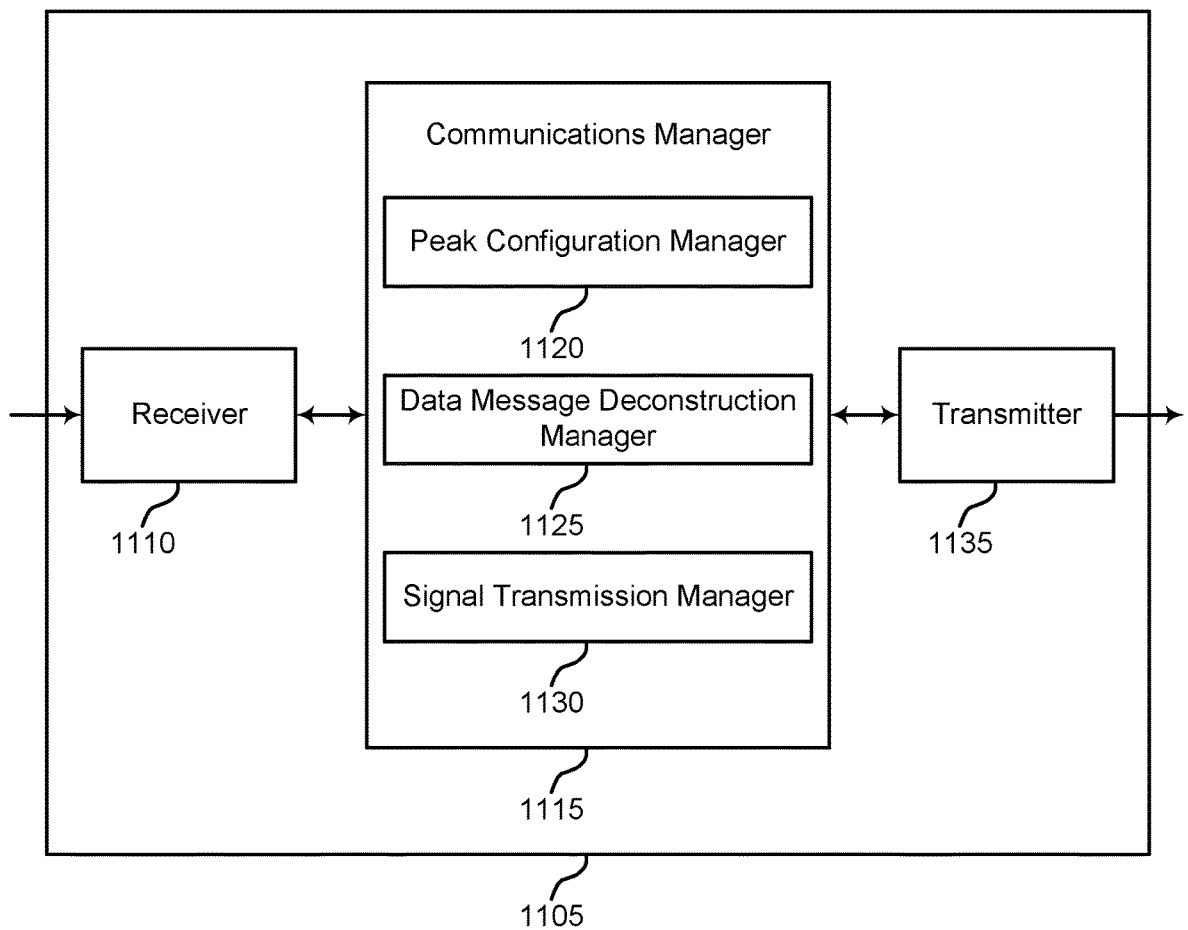

FIG. 11 shows a block diagram of a device 1105 that supports reducing amplitude signaling overhead in peak suppression information in accordance with aspects of the present disclosure. The device 1105 may be an example of aspects of a device 1005, or a transmitting device 201 as described herein. The device 1105 may include a receiver 1110, a communications manager 1115, and a transmitter 1135. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to reducing amplitude signaling overhead in peak suppression information, among other examples). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a peak configuration manager 1120, a data message deconstruction manager 1125, and a signal transmission manager 1130. The communications manager 1115 may be an example of aspects of the communications manager 1310 described herein.

The peak configuration manager 1120 may determine a peak configuration corresponding to a duration associated with at least a portion of a data message.

The data message deconstruction manager 1125 may deconstruct at least the portion of the data message into a data signal and peak suppression information by adjusting the data signal based on a constant amplitude offset associated with the peak configuration.

The signal transmission manager 1130 may transmit the data signal in the duration and a message including the peak suppression information.

The transmitter 1135 may transmit signals generated by other components of the device 1105. In some examples, the transmitter 1135 may be collocated with a receiver 1110 in a transceiver component. For example, the transmitter 1135 may be an example of aspects of the transceiver 1320 described with reference to FIG. 13. The transmitter 1135 may utilize a single antenna or a set of antennas.

Figure 12:
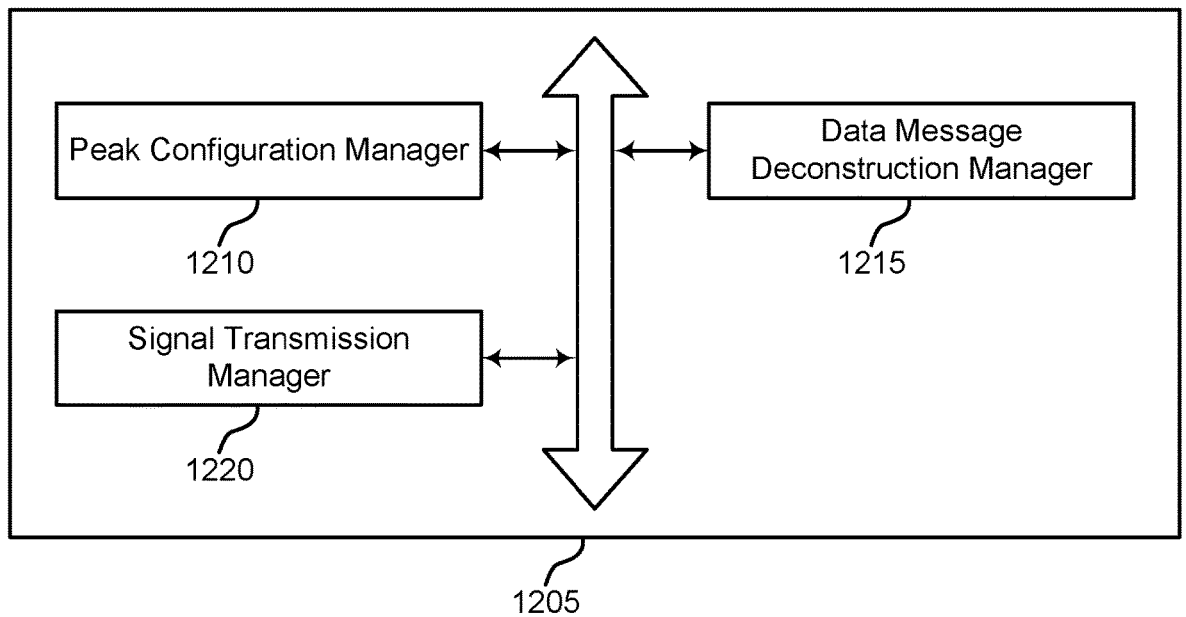
FIG. 12 shows a block diagram of a communications manager that supports reducing amplitude signaling overhead in peak suppression information in accordance with aspects of the present disclosure.

FIG. 12 shows a block diagram of a communications manager 1205 that supports reducing amplitude signaling overhead in peak suppression information in accordance with aspects of the present disclosure. The communications manager 1205 may be an example of aspects of a communications manager 1015, a communications manager 1115, or a communications manager 1310 described herein. The communications manager 1205 may include a peak configuration manager 1210, a data message deconstruction manager 1215, and a signal transmission manager 1220. Each of these components may communicate, directly or indirectly, with one another (for example, via one or more buses).

The peak configuration manager 1210 may determine a peak configuration corresponding to a duration associated with at least a portion of a data message.

In some examples, the peak configuration manager 1210 may determine a peak to average power ratio in the peak configuration, where the amplitude offset is based on the peak to average power ratio.

In some examples, the peak configuration manager 1210 may perform a root mean square calculation associated with the data signal, where the amplitude offset is based on the root mean square calculation. In some examples, the duration includes one or more of a symbol, a slot, or a subframe.

The data message deconstruction manager 1215 may deconstruct at least the portion of the data message into a data signal and peak suppression information by adjusting the data signal based on a constant amplitude offset associated with the peak configuration.

In some examples, the data message deconstruction manager 1215 may determine that the peak suppression information corresponds to a subset of amplitude peaks of the data signal, where deconstructing at least the portion of the data message is based on determining that the peak suppression information corresponds to the subset of amplitude peaks of the data signal.

In some examples, the data message deconstruction manager 1215 may adjust the subset of amplitude peaks using the amplitude offset based on determining that the peak suppression information corresponds to the subset of amplitude peaks of the data signal. In some examples, the constant amplitude offset is subtracted from each amplitude peak of the subset of amplitude peaks. In some examples, the subset of amplitude peaks include amplitude peaks of the data signal above a threshold amplitude. In some examples, the peak suppression information includes one or more of position information associated with one or more peaks of the data signal or phase information associated with one or more peaks of the data signal.

The signal transmission manager 1220 may transmit the data signal in the duration and a message including the peak suppression information.

In some examples, the signal transmission manager 1220 may indicate the peak to average power ratio in the peak suppression information.

Figure 13:
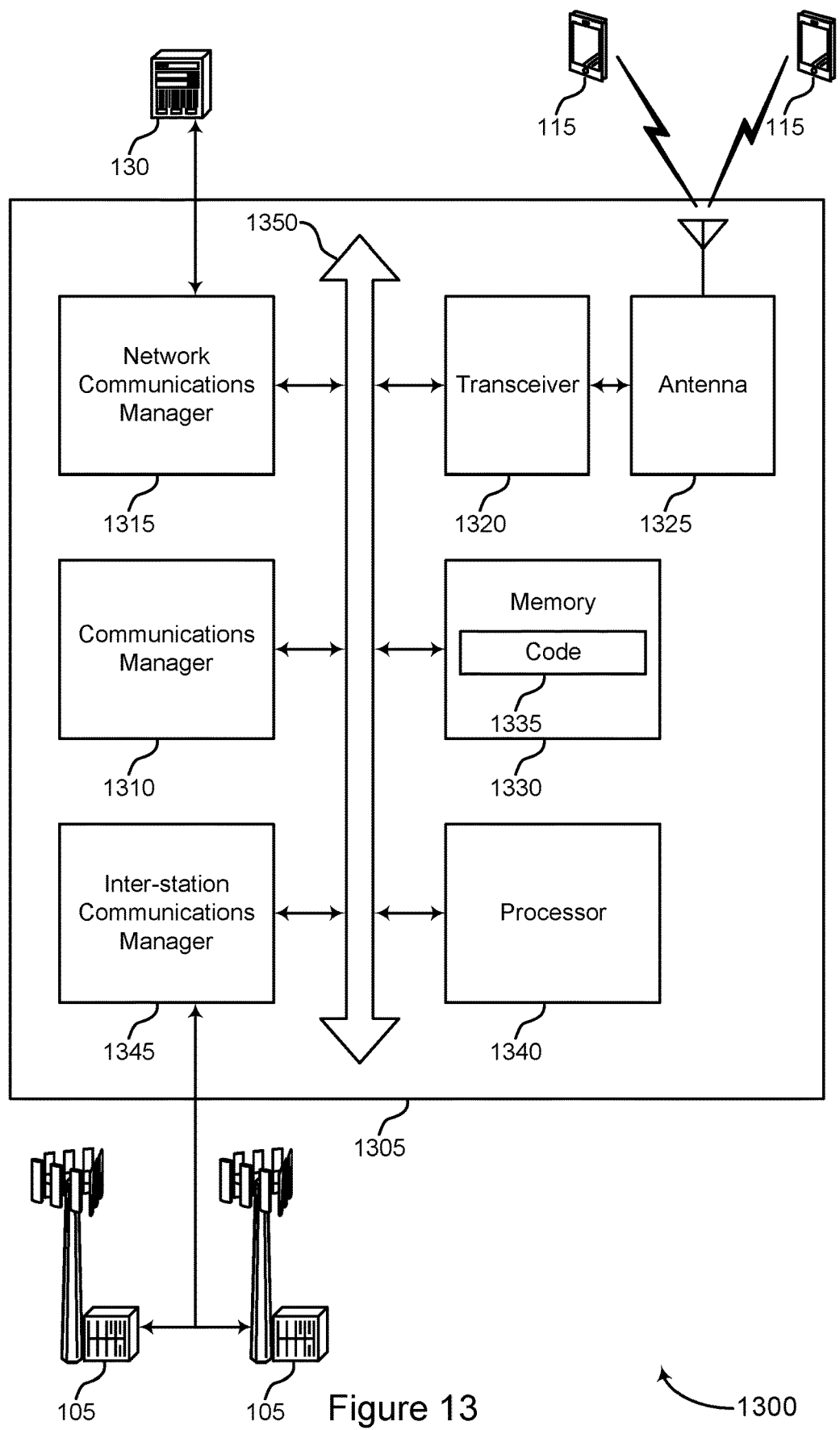
FIG. 13 shows a diagram of a system including a device that supports reducing amplitude signaling overhead in peak suppression information in accordance with aspects of the present disclosure.

FIG. 13 shows a diagram of a system 1300 including a device 1305 that supports reducing amplitude signaling overhead in peak suppression information in accordance with aspects of the present disclosure. The device 1305 may be an example of or include the components of device 1005, device 1105, or a transmitting device 201 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (for example, bus 1350).

The communications manager 1310 may determine a peak configuration corresponding to a duration associated with at least a portion of a data message, deconstruct at least the portion of the data message into a data signal and peak suppression information by adjusting the data signal based on a constant amplitude offset associated with the peak configuration, and transmit the data signal in the duration and a message including the peak suppression information.

The network communications manager 1315 may manage communications with the core network (for example, via one or more wired backhaul links). For example, the network communications manager 1315 may manage the transfer of data communications for client devices, such as one or more UEs 115.

The transceiver 1320 may communicate bi-directionally, via one or more antennas, wired, or wireless links. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

The memory 1330 may include one or both of RAM or ROM. The memory 1330 may store computer-readable code 1335 including instructions that, when executed by a processor (for example, the processor 1340) cause the device to perform various functions described herein. In some examples, the memory 1330 may contain, among other things, a BIOS which may control basic hardware or software operation such as the interaction with peripheral components or devices.

The processor 1340 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some examples, a memory controller may be integrated into processor 1340. The processor 1340 may be configured to execute computer-readable instructions stored in a memory (for example, the memory 1330) to cause the device 1305 to perform various functions (for example, functions or tasks supporting reducing amplitude signaling overhead in peak suppression information).

The inter-station communications manager 1345 may manage communications with other transmitting device 201, and may include a controller or scheduler for controlling communications with UEs 115 in cooperation with base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (for example, when compiled and executed) to perform functions described herein.

Figure 14:
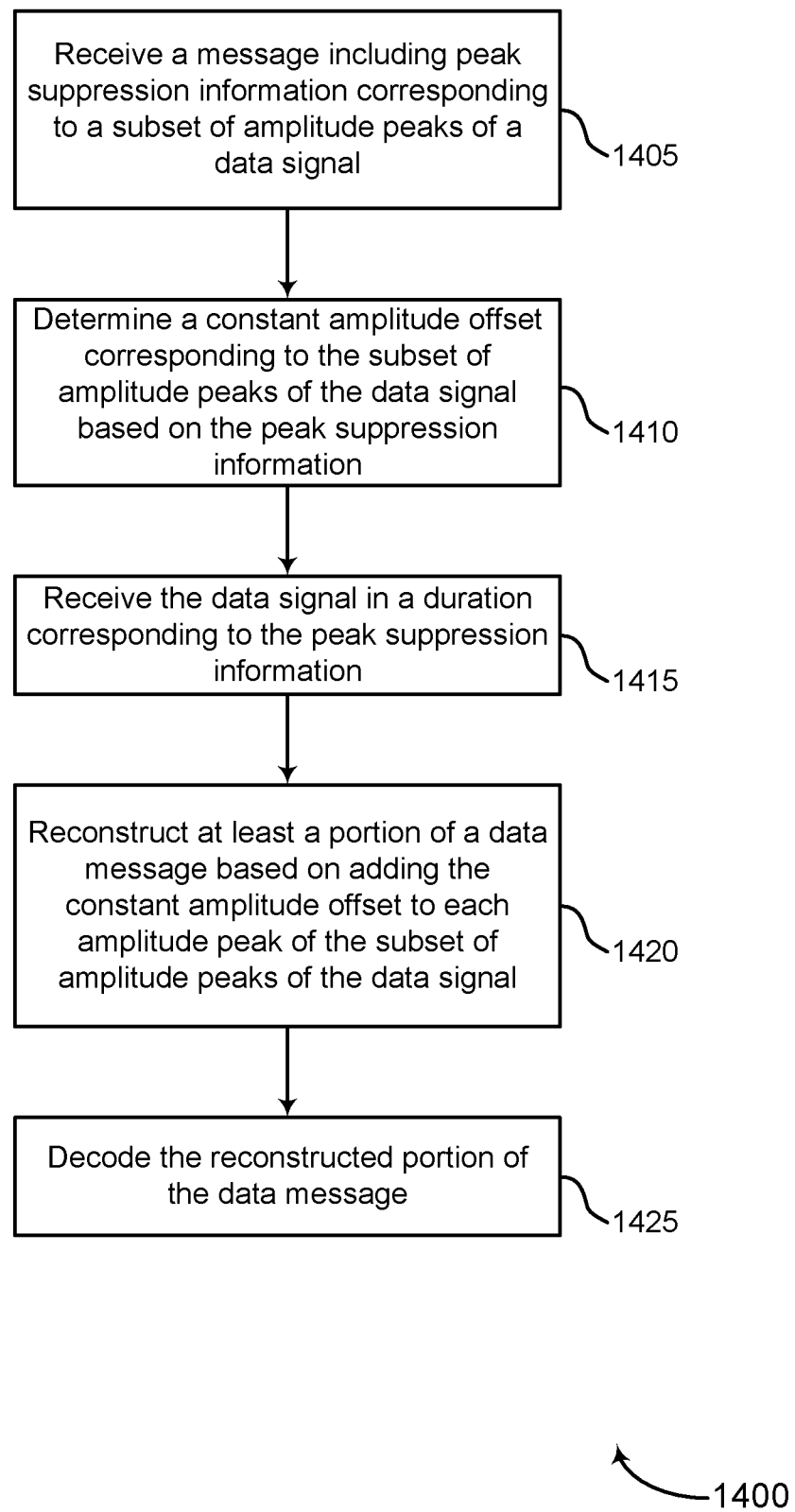
FIGS. 14-17 show flowcharts illustrating methods that support reducing amplitude signaling overhead in peak suppression information in accordance with aspects of the present disclosure.

FIG. 14 shows a flowchart illustrating a method 1400 that supports reducing amplitude signaling overhead in peak suppression information in accordance with aspects of the present disclosure. The operations of method 1400 may be implemented by a receiving device 202 or its components as described herein. For example, the operations of method 1400 may be performed by a communications manager as described with reference to FIGS. 6-9. In some examples, a receiving device may execute a set of instructions to control the functional elements of the receiving device to perform the functions described herein. Additionally or alternatively, a receiving device may perform aspects of the functions described herein using special-purpose hardware.

At 1405, the receiving device may receive a message including peak suppression information corresponding to a subset of amplitude peaks of a data signal. The operations of 1405 may be performed according to the methods described herein. In some examples, aspects of the operations of 1405 may be performed by a PSIM receiving manager as described with reference to FIGS. 6-9.

At 1410, the receiving device may determine a constant amplitude offset corresponding to the subset of amplitude peaks of the data signal based on the peak suppression information. The operations of 1410 may be performed according to the methods described herein. In some examples, aspects of the operations of 1410 may be performed by an amplitude offset component as described with reference to FIGS. 6-9.

At 1415, the receiving device may receive the data signal in a duration corresponding to the peak suppression information. The operations of 1415 may be performed according to the methods described herein. In some examples, aspects of the operations of 1415 may be performed by a data signal manager as described with reference to FIGS. 6-9.

At 1420, the receiving device may reconstruct at least a portion of a data message based on adding the constant amplitude offset to each amplitude peak of the subset of amplitude peaks of the data signal. The operations of 1420 may be performed according to the methods described herein. In some examples, aspects of the operations of 1420 may be performed by a data message reconstruction manager as described with reference to FIGS. 6-9.

At 1425, the receiving device may decode the reconstructed portion of the data message. The operations of 1425 may be performed according to the methods described herein. In some examples, aspects of the operations of 1425 may be performed by a decoder as described with reference to FIGS. 6-9.

Figure 15:
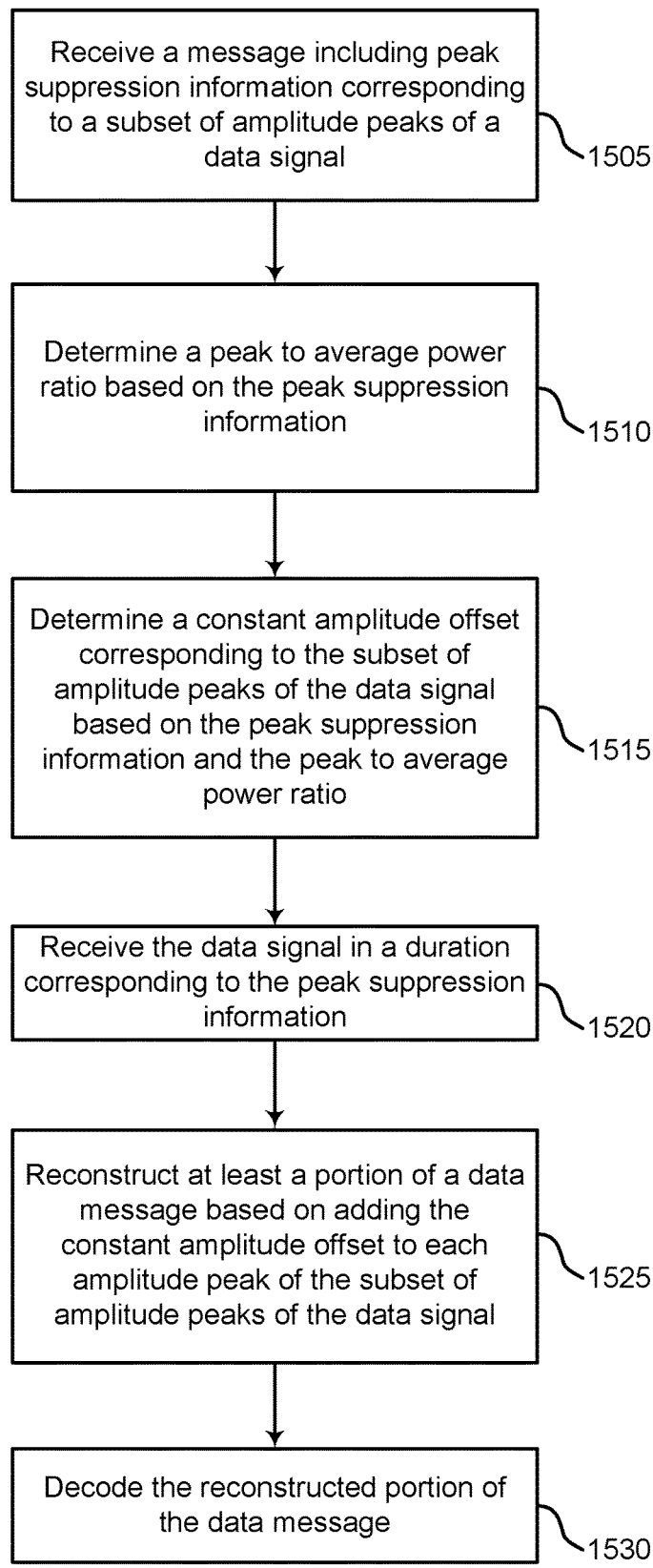

FIG. 15 shows a flowchart illustrating a method 1500 that supports reducing amplitude signaling overhead in peak suppression information in accordance with aspects of the present disclosure. The operations of method 1500 may be implemented by a receiving device 202 or its components as described herein. For example, the operations of method 1500 may be performed by a communications manager as described with reference to FIGS. 6-9. In some examples, a receiving device may execute a set of instructions to control the functional elements of the receiving device to perform the functions described herein. Additionally or alternatively, a receiving device may perform aspects of the functions described herein using special-purpose hardware.

At 1505, the receiving device may receive a message including peak suppression information corresponding to a subset of amplitude peaks of a data signal. The operations of 1505 may be performed according to the methods described herein. In some examples, aspects of the operations of 1505 may be performed by a PSIM receiving manager as described with reference to FIGS. 6-9.

At 1510, the receiving device may determine a peak to average power ratio based on the peak suppression information. The operations of 1510 may be performed according to the methods described herein. In some examples, aspects of the operations of 1510 may be performed by an amplitude offset component as described with reference to FIGS. 6-9.

At 1515, the receiving device may determine a constant amplitude offset corresponding to the subset of amplitude peaks of the data signal based on the peak suppression information and the peak to average power ratio. The operations of 1515 may be performed according to the methods described herein. In some examples, aspects of the operations of 1515 may be performed by an amplitude offset component as described with reference to FIGS. 6-9.

At 1520, the receiving device may receive the data signal in a duration corresponding to the peak suppression information. The operations of 1520 may be performed according to the methods described herein. In some examples, aspects of the operations of 1520 may be performed by a data signal manager as described with reference to FIGS. 6-9.

At 1525, the receiving device may reconstruct at least a portion of a data message based on adding the constant amplitude offset to each amplitude peak of the subset of amplitude peaks of the data signal. The operations of 1525 may be performed according to the methods described herein. In some examples, aspects of the operations of 1525 may be performed by a data message reconstruction manager as described with reference to FIGS. 6-9.

At 1530, the receiving device may decode the reconstructed portion of the data message. The operations of 1530 may be performed according to the methods described herein. In some examples, aspects of the operations of 1530 may be performed by a decoder as described with reference to FIGS. 6-9.

Figure 16:
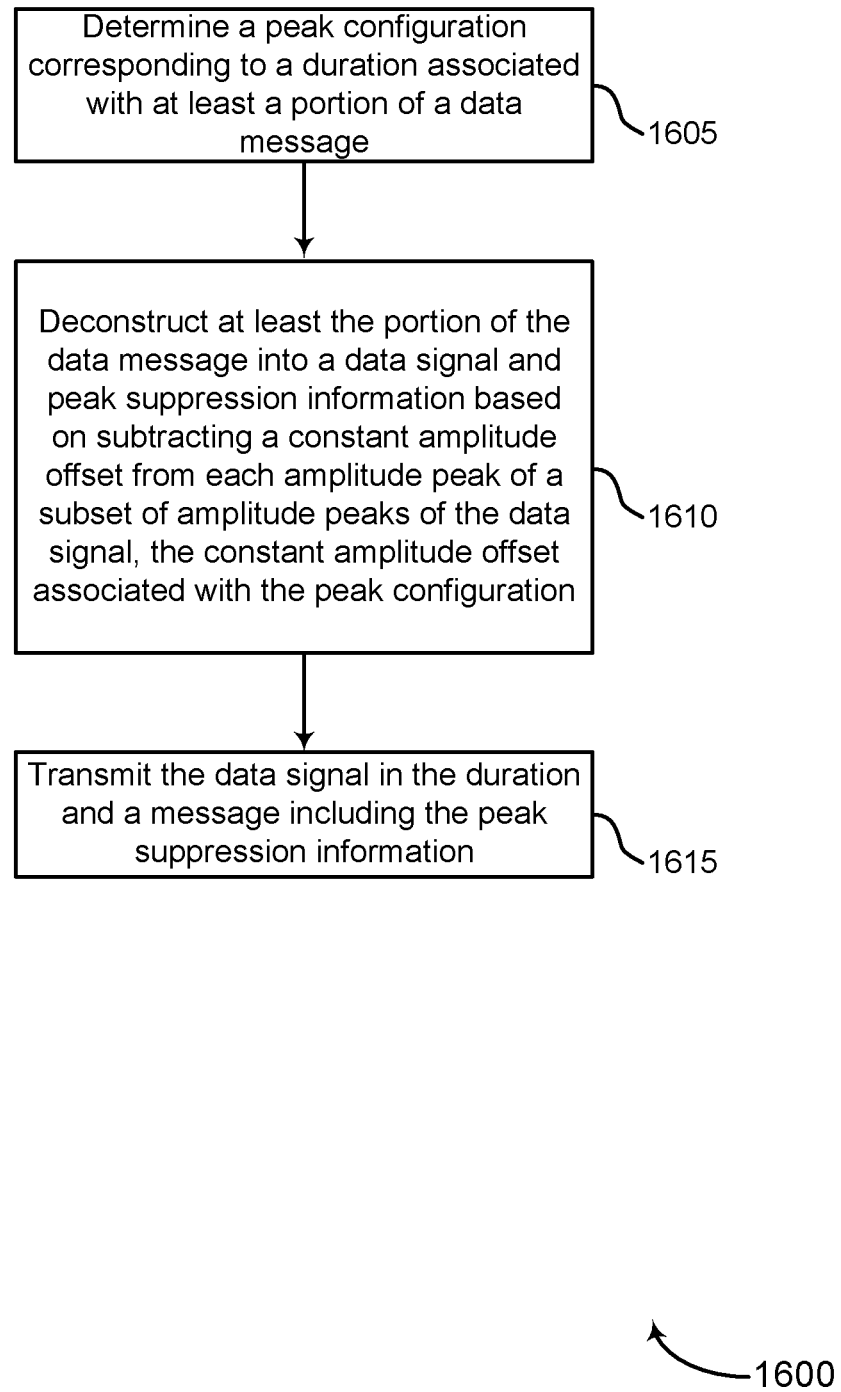

FIG. 16 shows a flowchart illustrating a method 1600 that supports reducing amplitude signaling overhead in peak suppression information in accordance with aspects of the present disclosure. The operations of method 1600 may be implemented by a transmitting device 201 or its components as described herein. For example, the operations of method 1600 may be performed by a communications manager as described with reference to FIGS. 10-13. In some examples, a transmitting device may execute a set of instructions to control the functional elements of the transmitting device to perform the functions described herein. Additionally or alternatively, a transmitting device may perform aspects of the functions described herein using special-purpose hardware.

At 1605, the transmitting device may determine a peak configuration corresponding to a duration associated with at least a portion of a data message. The operations of 1605 may be performed according to the methods described herein. In some examples, aspects of the operations of 1605 may be performed by a peak configuration manager as described with reference to FIGS. 10-13.

At 1610, the transmitting device may deconstruct at least the portion of the data message into a data signal and peak suppression information based on subtracting a constant amplitude offset from each amplitude peak of a subset of amplitude peaks of the data signal, the constant amplitude offset associated with the peak configuration. The operations of 1610 may be performed according to the methods described herein. In some examples, aspects of the operations of 1610 may be performed by a data message deconstruction manager as described with reference to FIGS. 10-13.

At 1615, the transmitting device may transmit the data signal in the duration and a message including the peak suppression information. The operations of 1615 may be performed according to the methods described herein. In some examples, aspects of the operations of 1615 may be performed by a signal transmission manager as described with reference to FIGS. 10-13.

Figure 17:
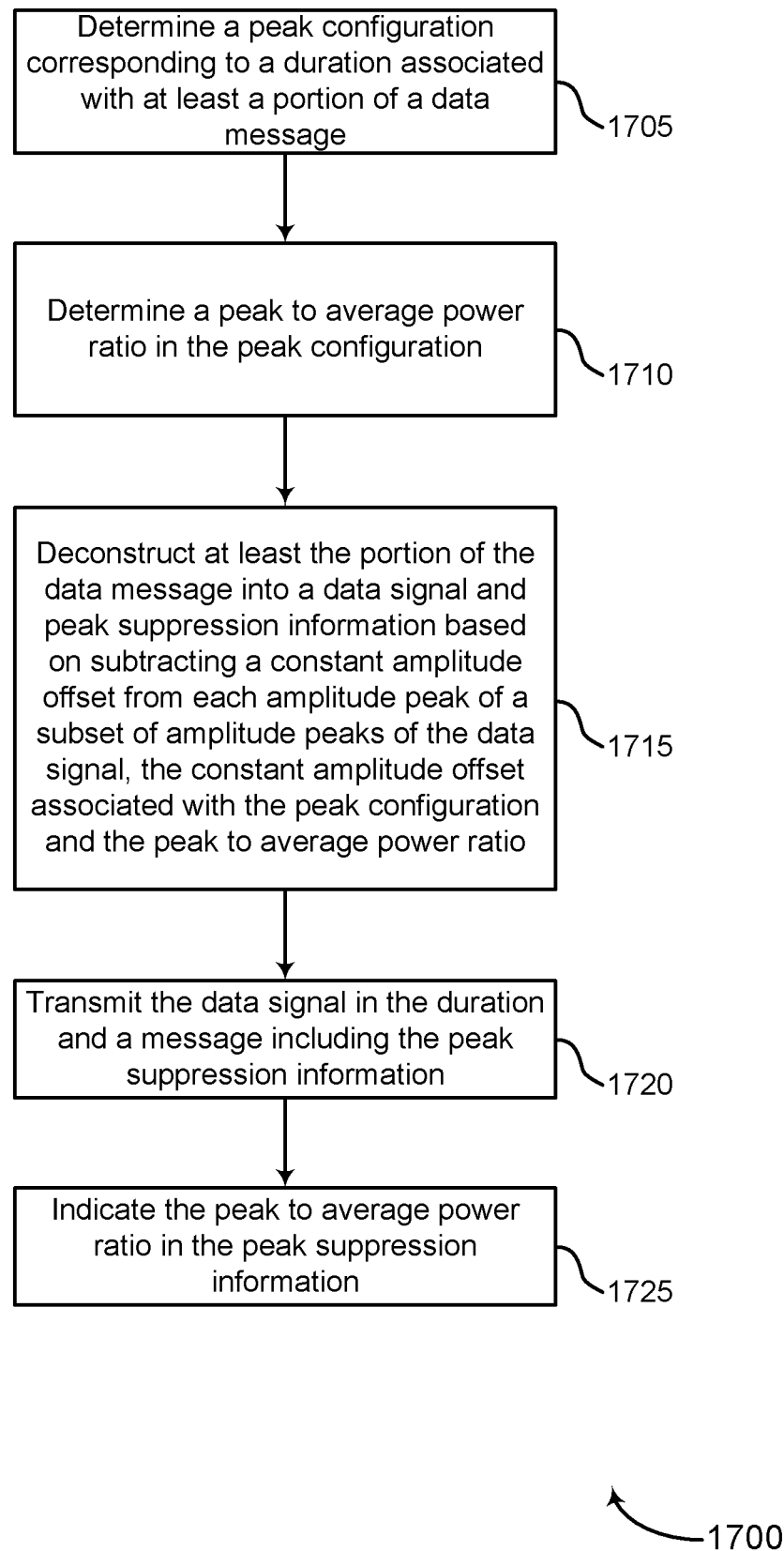

FIG. 17 shows a flowchart illustrating a method 1700 that supports reducing amplitude signaling overhead in peak suppression information in accordance with aspects of the present disclosure. The operations of method 1700 may be implemented by a transmitting device 201 or its components as described herein. For example, the operations of method 1700 may be performed by a communications manager as described with reference to FIGS. 10-13. In some examples, a transmitting device may execute a set of instructions to control the functional elements of the transmitting device to perform the functions described herein. Additionally or alternatively, a transmitting device may perform aspects of the functions described herein using special-purpose hardware.

At 1705, the transmitting device may determine a peak configuration corresponding to a duration associated with at least a portion of a data message. The operations of 1705 may be performed according to the methods described herein. In some examples, aspects of the operations of 1705 may be performed by a peak configuration manager as described with reference to FIGS. 10-13.

At 1710, the transmitting device may determine a peak to average power ratio in the peak configuration. The operations of 1710 may be performed according to the methods described herein. In some examples, aspects of the operations of 1710 may be performed by a peak configuration manager as described with reference to FIGS. 10-13.

At 1715, the transmitting device may deconstruct at least the portion of the data message into a data signal and peak suppression information based on subtracting a constant amplitude offset from each amplitude peak of a subset of amplitude peaks of the data signal, the constant amplitude offset associated with the peak configuration and the peak to average power ratio. The operations of 1715 may be performed according to the methods described herein. In some examples, aspects of the operations of 1715 may be performed by a data message deconstruction manager as described with reference to FIGS. 10-13.

At 1720, the transmitting device may transmit the data signal in the duration and a message including the peak suppression information. The operations of 1720 may be performed according to the methods described herein. In some examples, aspects of the operations of 1720 may be performed by a signal transmission manager as described with reference to FIGS. 10-13.

At 1725, the transmitting device may indicate the peak to average power ratio in the peak suppression information. The operations of 1725 may be performed according to the methods described herein. In some examples, aspects of the operations of 1725 may be performed by a signal transmission manager as described with reference to FIGS. 10-13.

The following provides an overview of aspects of the present disclosure:

Aspect 1: A method for wireless communications at a receiving device, comprising: receiving a message comprising peak suppression information corresponding to a duration; determining a constant amplitude offset for adjusting a signal based at least in part on the peak suppression information; receiving a data signal in the duration; reconstructing at least a portion of a data message by adjusting the data signal based at least in part on the constant amplitude offset; and decoding the reconstructed portion of the data message.

Aspect 2: The method of aspect 1, further comprising determining a peak to average power ratio from the peak suppression information, wherein determining the constant amplitude offset is based at least in part on determining the peak to average power ratio.

Aspect 3: The method of any of aspects 1 through 2, further comprising determining that the peak suppression information corresponds to a subset of amplitude peaks of the data signal, wherein reconstructing at least the portion of the data message is based at least in part on determining that the peak suppression information corresponds to the subset of amplitude peaks of the data signal.

Aspect 4: The method of aspect 3, wherein reconstructing at least the portion of the data message comprises adjusting the subset of amplitude peaks using the constant amplitude offset based at least in part on determining that the peak suppression information corresponds to the subset of amplitude peaks of the data signal.

Aspect 5: The method of any of aspects 3 through 4, wherein the constant amplitude offset is subtracted from each amplitude peak of the subset of amplitude peaks.

Aspect 6: The method of any of aspects 3 through 5, wherein the subset of amplitude peaks comprise amplitude peaks of the data signal above a threshold amplitude.

Aspect 7: The method of aspect 6, further comprising determining the threshold amplitude based at least in part on a configuration at the receiving device or the message comprising the peak suppression information.

Aspect 8: The method of any of aspects 1 through 7, further comprising performing a root mean square calculation associated with the data signal, wherein the constant amplitude offset is determined based at least in part on the root mean square calculation.

Aspect 9: The method of any of aspects 1 through 8, wherein the duration comprises one or more of a symbol, a slot, or a subframe.

Aspect 10: The method of any of aspects 1 through 9, wherein the peak suppression information comprises one or more of position information associated with one or more peaks of the data signal or phase information associated with one or more peaks of the data signal.

Aspect 11: A method for wireless communications at a transmitting device, comprising: determining a peak configuration corresponding to a duration associated with at least a portion of a data message; deconstructing at least the portion of the data message into a data signal and peak suppression information by adjusting the data signal based at least in part on a constant amplitude offset associated with the peak configuration; and transmitting the data signal in the duration and a message comprising the peak suppression information.

Aspect 12: The method of aspect 11, further comprising: determining a peak to average power ratio in the peak configuration, wherein the constant amplitude offset is based at least in part on the peak to average power ratio; and indicating the peak to average power ratio in the peak suppression information.

Aspect 13: The method of any of aspects 11 through 12, further comprising determining that the peak suppression information corresponds to a subset of amplitude peaks of the data signal, wherein deconstructing at least the portion of the data message is based at least in part on determining that the peak suppression information corresponds to the subset of amplitude peaks of the data signal.

Aspect 14: The method of aspect 13, wherein deconstructing at least the portion of the data message comprises adjusting the subset of amplitude peaks using the constant amplitude offset based at least in part on determining that the peak suppression information corresponds to the subset of amplitude peaks of the data signal.

Aspect 15: The method of any of aspects 13 through 14, wherein the constant amplitude offset is subtracted from each amplitude peak of the subset of amplitude peaks.

Aspect 16: The method of any of aspects 13 through 15, wherein the subset of amplitude peaks comprise amplitude peaks of the data signal above a threshold amplitude.

Aspect 17: The method of any of aspects 11 through 16, further comprising performing a root mean square calculation associated with the data signal, wherein the constant amplitude offset is based at least in part on the root mean square calculation.

Aspect 18: The method of any of aspects 11 through 17, wherein the duration comprises one or more of a symbol, a slot, or a subframe.

Aspect 19: The method of any of aspects 11 through 18, wherein the peak suppression information comprises one or more of position information associated with one or more peaks of the data signal or phase information associated with one or more peaks of the data signal.

Aspect 20: An apparatus for wireless communications at a receiving device, comprising a processor; memory coupled with the processor; and instructions stored in the memory and executable by the processor to cause the apparatus to perform a method of any of aspects 1 through 10.

Aspect 21: An apparatus for wireless communications at a receiving device, comprising at least one means for performing a method of any of aspects 1 through 10.

Aspect 22: A non-transitory computer-readable medium storing code for wireless communications at a receiving device, the code comprising instructions executable by a processor to perform a method of any of aspects 1 through 10.

Aspect 23: An apparatus for wireless communications at a transmitting device, comprising a processor; memory coupled with the processor; and instructions stored in the memory and executable by the processor to cause the apparatus to perform a method of any of aspects 11 through 19.

Aspect 24: An apparatus for wireless communications at a transmitting device, comprising at least one means for performing a method of any of aspects 11 through 19.

Aspect 25: A non-transitory computer-readable medium storing code for wireless communications at a transmitting device, the code comprising instructions executable by a processor to perform a method of any of aspects 11 through 19.

The methods described herein describe possible implementations. However, other implementations in which the operations and the steps are rearranged or otherwise modified may also be possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by one or more voltages, currents, electromagnetic waves, magnetic fields or particles, or optical fields or particles.

The various illustrative blocks and components described in connection with the disclosure herein may be implemented or performed with one or more of a general-purpose processor, a DSP, an ASIC, a CPU, an FPGA or other programmable logic device, discrete gate or transistor logic, or discrete hardware components designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in one or more of hardware, software executed by a processor, or firmware. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a receiving device, comprising:
receiving a message comprising peak suppression information corresponding to a subset of amplitude peaks of a data signal;
determining a constant amplitude offset corresponding to the subset of amplitude peaks of the data signal in accordance with the peak suppression information;
receiving the data signal in a duration corresponding to the peak suppression information;
reconstructing at least a portion of a data message in accordance with adding the constant amplitude offset to each amplitude peak of the subset of amplitude peaks of the data signal;
decoding the reconstructed portion of the data message;
determining a peak to average power ratio in accordance with the peak suppression information, the determining the constant amplitude offset is associated with determining the peak to average power ratio; and
performing a root mean square calculation associated with the data signal in accordance with the peak to average power ratio.

2. The method of claim 1, wherein the constant amplitude offset is determined in accordance with the root mean square calculation.

3. The method of claim 1, wherein the constant amplitude offset is subtracted from each amplitude peak of the subset of amplitude peaks in the data signal.

4. The method of claim 1, wherein the subset of amplitude peaks comprise amplitude peaks of the data signal above a threshold amplitude.

5. The method of claim 4, further comprising determining the threshold amplitude in accordance with a configuration at the receiving device or the peak suppression information.

6. The method of claim 1, wherein the duration comprises one or more of a symbol, a slot, or a subframe.

7. A method for wireless communications at a transmitting device, comprising:
determining a peak configuration corresponding to a duration associated with at least a portion of a data message;
deconstructing at least the portion of the data message into a data signal and peak suppression information in accordance with subtracting a constant amplitude offset from each amplitude peak of a subset of amplitude peaks of the data signal, the constant amplitude offset associated with the peak configuration;
transmitting the data signal in the duration and a message comprising the peak suppression information;
determining a peak to average power ratio in the peak configuration, the constant amplitude offset associated with the peak to average power ratio;
indicating the peak to average power ratio in the peak suppression information; and
performing a root mean square calculation associated with the data signal in accordance with the peak configuration.

8. The method of claim 7, wherein the constant amplitude offset is associated with the root mean square calculation.

9. The method of claim 7, wherein the subset of amplitude peaks comprise amplitude peaks of the data signal above a threshold amplitude.

10. The method of claim 7, wherein the duration comprises one or more of a symbol, a slot, or a subframe.

11. The method of claim 7, wherein the peak suppression information comprises one or more of position information associated with one or more peaks of the data signal or phase information associated with one or more peaks of the data signal.

12. An apparatus for wireless communications at a receiving device, comprising:
a processor,
memory coupled with the processor; and
instructions stored in the memory and executable by the processor to cause the apparatus to:
receive a message comprising peak suppression information corresponding to a subset of amplitude peaks of a data signal;
determine a constant amplitude offset corresponding to the subset of amplitude peaks of the data signal in accordance with the peak suppression information;
receive the data signal in a duration corresponding to the peak suppression information;
reconstruct at least a portion of a data message in accordance with adding the constant amplitude offset to each amplitude peak of the subset of amplitude peaks of the data signal;
decode the reconstructed portion of the data message;
determine a peak to average power ratio in accordance with the peak suppression information, the determining the constant amplitude offset is associated with determining the peak to average power ratio; and
perform a root mean square calculation associated with the data signal in accordance with the peak to average power ratio.

13. The apparatus of claim 12, wherein the constant amplitude offset is determined in accordance with the root mean square calculation.

14. The apparatus of claim 12, wherein the constant amplitude offset is subtracted from each amplitude peak of the subset of amplitude peaks in the data signal.

15. The apparatus of claim 12, wherein the subset of amplitude peaks comprise amplitude peaks of the data signal above a threshold amplitude.

16. The apparatus of claim 15, wherein the instructions are further executable by the processor to cause the apparatus to determine a threshold amplitude in accordance with a configuration at the receiving device or the peak suppression information.

17. The apparatus of claim 12, wherein the duration comprises one or more of a symbol, a slot, or a subframe.

18. An apparatus for wireless communications at a transmitting device, comprising:
a processor,
memory coupled with the processor; and
instructions stored in the memory and executable by the processor to cause the apparatus to:
determine a peak configuration corresponding to a duration associated with at least a portion of a data message;
deconstruct at least the portion of the data message into a data signal and peak suppression information in accordance with subtracting a constant amplitude offset from each amplitude peak of a subset of amplitude peaks of the data signal, the constant amplitude offset associated with the peak configuration;
transmit the data signal in the duration and a message comprising the peak suppression information;

determine a peak to average power ratio in the peak configuration, the constant amplitude offset associated with the peak to average power ratio;

indicate the peak to average power ratio in the peak suppression information; and perform a root mean square calculation associated with the data signal in accordance with the peak configuration.

19. The apparatus of claim 18, wherein the constant amplitude offset is associated with the root mean square calculation.

20. The apparatus of claim 18, wherein the subset of amplitude peaks comprise amplitude peaks of the data signal above a threshold amplitude.

21. The apparatus of claim 18, wherein the duration comprises one or more of a symbol, a slot, or a subframe.

22. The apparatus of claim 18, wherein the peak suppression information comprises one or more of position information associated with one or more peaks of the data signal or phase information associated with one or more peaks of the data signal.

* * * * *